(12) United States Patent
Hjelmstad

(10) Patent No.: US 10,175,356 B2
(45) Date of Patent: *Jan. 8, 2019

(54) LASER DETECTION AND RANGING DEVICE FOR DETECTING AN OBJECT UNDER A WATER SURFACE

(71) Applicants: LADAR LIMITED, George Hill (AI); HJELMSTAD AS, Lillestrom (NO)

(72) Inventor: Jens Hjelmstad, Lillestrom (NO)

(73) Assignees: LADAR LIMITED, George Hill (AI); HJELMSTAD AS, Lillestrom (NO)

( * ) Notice: Subject to any disclaimer, the term of this patent is extended or adjusted under 35 U.S.C. 154(b) by 198 days.

This patent is subject to a terminal disclaimer.

(21) Appl. No.: 15/031,021

(22) PCT Filed: Oct. 23, 2014

(86) PCT No.: PCT/EP2014/072789
§ 371 (c)(1),
(2) Date: Apr. 21, 2016

(87) PCT Pub. No.: WO2015/059244
PCT Pub. Date: Apr. 30, 2015

(65) Prior Publication Data
US 2016/0291156 A1    Oct. 6, 2016

(30) Foreign Application Priority Data
Oct. 23, 2013    (EP) .................................. 13189865

(51) Int. Cl.
*G01C 3/08*    (2006.01)
*G01S 17/10*    (2006.01)
(Continued)

(52) U.S. Cl.
CPC ............ *G01S 17/102* (2013.01); *G01S 7/499* (2013.01); *G01S 17/023* (2013.01); *G01S 17/42* (2013.01); *G01S 17/89* (2013.01); *G01S 13/865* (2013.01)

(58) Field of Classification Search
CPC ...... G01S 17/102; G01S 7/499; G01S 17/023; G01S 17/42; G01S 17/89; G01S 13/865
See application file for complete search history.

(56) References Cited

U.S. PATENT DOCUMENTS

| 5,822,047 A | 10/1998 | Contarino et al. |
| 6,031,601 A | 2/2000 | McCusker et al. |

(Continued)

FOREIGN PATENT DOCUMENTS

| JP | S629284 | 1/1987 |
| JP | 2008032745 | 2/2008 |

(Continued)

OTHER PUBLICATIONS

Hardy, Kevin; and Leonard Sanches, John Sanderson, DeepSea Power & Light, Diode Lasers in Underwater Applications, as seen in Ocean News & Technology. Jun. 2010. (Year: 2010).*

(Continued)

*Primary Examiner* — Samantha K Abraham
(74) *Attorney, Agent, or Firm* — Brooks Kushman P.C.

(57) ABSTRACT

A laser detection and ranging device for detecting an object under a water surface, the laser detection and ranging device having a laser transmitter being configured to modulate a laser beam by a binary pseudo-random coding sequence to obtain a modulated laser beam, and to transmit the modulated laser beam towards the water surface, a laser detector for detecting a reflected laser beam, the reflected laser beam forming a reflected version of the transmitted laser beam, (Continued)

and a processor for detecting the object under the water surface upon the basis of the reflected laser beam.

15 Claims, 21 Drawing Sheets

(51) Int. Cl.
  *G01S 17/02* (2006.01)
  *G01S 17/42* (2006.01)
  *G01S 17/89* (2006.01)
  *G01S 7/499* (2006.01)
  *G01S 13/86* (2006.01)

(56) References Cited

U.S. PATENT DOCUMENTS

| | | | |
|---|---|---|---|
| 8,072,582 B2* | 12/2011 | Meneely | G01S 17/102 356/3.01 |
| 2007/0296974 A1* | 12/2007 | Violette | G03F 7/70141 356/400 |
| 2009/0046289 A1 | 2/2009 | Caldwell et al. | |
| 2009/0271054 A1* | 10/2009 | Dokken | G01S 13/9307 701/21 |
| 2010/0027602 A1 | 2/2010 | Abshire et al. | |
| 2011/0274429 A1* | 11/2011 | Caplan | H04B 10/5561 398/65 |
| 2011/0317147 A1 | 12/2011 | Campbell et al. | |

FOREIGN PATENT DOCUMENTS

| | | |
|---|---|---|
| JP | 2009192217 | 8/2009 |
| JP | 2012154678 | 8/2012 |

OTHER PUBLICATIONS

International Search Report for PCT/EP2014/072789, Completed by the European Patent Office dated Feb. 17, 2015 5, Pages.
Written Opinion for PCT/EP2014/072789, Completed by the European Patent Office, dated Feb. 17, 2015, 9 Pages.
Cianciotto et al. Aerospace and electronics conference Jul. 14, 1997, XP 010242860, pp. 463-468, "Detection and classification of sub-surface objects in a marine environment by the use of a lidar system".
Alekseyev et al. Electronics Conference Oct. 6, 2008, pp. 349-352, XP 031352730, "Control and signal processing system of hyperspectral FLS LiDAR".
Oh et al. IEEE Sensors Oct. 28, 2012, pp. 1-4, XP 032308718, "Oil Spill Detection Sensor using Artificial Illumination with Blue LEDs".
Shiina, Communications and Photonics Conference and Exhibition Nov. 13, 2011, pp. 1-6, XP 032206265 "Optical Design and development of Near Range Compact Lidar".
Fernandez-Diaz et al. Geoscience and Remote Sensing Symposium 2012 IEEE International Jul. 22, 2012, pp. 4994-4997, XP 032469958 "Early results from a high-resolution hybrid terrestrial and bathymetry mapping LiDAR".

* cited by examiner

LASER DETECTION AND RANGING DEVICE FOR DETECTING AN OBJECT UNDER A WATER SURFACE

CROSS-REFERENCE TO RELATED APPLICATION

This application is the U.S. national phase of PCT Application No. PCT/EP2014/072789 filed on Oct. 23, 2014, which claims priority to EP Patent Application No. 13189865.2 filed on Oct. 23, 2013, the disclosures of which are incorporated in their entirety by reference herein.

TECHNICAL FIELD

The present invention relates to object detection.

BACKGROUND OF THE INVENTION

Objects under a water surface, i.e. submarine objects, can coarsely be detected from a position above the water surface using a sound navigation and ranging (sonar) device.

Sound navigation and ranging devices are based on transmitting an acoustic wave in the water towards the object, and detecting an acoustic wave which has been reflected by the object. The acoustic wave can be pulsed and/or modulated. Common modulation schemes comprise e.g. a continuous transmission frequency modulation (CTFM) scheme.

The attainable precision and resolution of object detection are mainly influenced by the properties of the applied acoustic wave such as the center frequency or the covered frequency bandwidth of the acoustic wave. Furthermore, the propagation scenario of the acoustic wave in the water, in particular attenuation and propagation speed, influences the attainable precision and resolution of object detection.

Common sound navigation and ranging devices for the detection of objects under a water surface operate in an acoustic frequency range extending from 10 kHz to 1 MHz. The propagation scenario is non-stationary due to pressure variations and consequently propagation speed variations of the water medium and poses significant challenges to object detection. Undesired reflections of the acoustic wave at the water surface and the water ground further impede the detection of objects.

Therefore, the detection of objects under a water surface using a sound navigation and ranging device is limited to the detection of large objects at short or medium ranges. The detection of small objects or at long ranges is usually not possible due to the non-stationary propagation scenario and the limited frequency bandwidth of the acoustic wave.

SUMMARY OF THE INVENTION

It is therefore the object of the invention to provide an improved concept for detecting an object under a water surface.

This object is achieved by the features of the independent claims. Further implementation forms are apparent from the dependent claims, the description and the figures.

The invention is based on the finding that objects under a water surface can be detected precisely using a laser detection and ranging (ladar) device. The laser detection and ranging device can modulate a laser beam and transmit the modulated laser beam towards the water surface. The transmitted laser beam can then be refracted at the water surface and can be reflected by the object under the water surface. The reflected laser beam can then be detected by the laser detection and ranging device and the object under the water surface can be detected upon the basis of the reflected laser beam. Therefore, the object under the water surface can be detected at short, medium and long ranges from a position above the water surface. The usage of a modulated laser beam can further allow for a high precision and high resolution detection of the object.

According to an aspect, the invention relates to a laser detection and ranging device for detecting an object under a water surface, the laser detection and ranging device comprising a laser transmitter being configured to modulate a laser beam by a binary pseudo-random coding sequence to obtain a modulated laser beam, and to transmit the modulated laser beam towards the water surface, a laser detector for detecting a reflected laser beam, the reflected laser beam forming a reflected version of the transmitted laser beam, and a processor for detecting the object under the water surface upon the basis of the reflected laser beam.

The laser detection and ranging device can be mounted on a marine seagoing vessel, e.g. a ship, or a marine stand-still platform, e.g. an oil production platform. The laser detection and ranging device can further be installed at a marine harbor or marine port.

The object can be a submarine obstacle. The water surface can be defined as the surface layer between water and air.

The laser transmitter can be a solid state laser, e.g. a neodymium-doped yttrium aluminum garnet (Nd:YAG) laser. The laser transmitter can further be a dye laser or a gas laser. The laser transmitter can comprise a non-linear optical element, e.g. for frequency doubling. The laser transmitter can operate at an infrared frequency band, an optical frequency band, or an ultraviolet frequency band. The laser transmitter can comprise a laser, in particular a blue-green laser, for generating the laser beam.

The laser detector can be a semiconductor-based laser detector or a tube-based laser detector. The laser detector can be configured to convert the detected laser beam into an electrical signal.

The processor can be programmably arranged to detect the object under the water surface upon the basis of the reflected laser beam.

The transmitted laser beam can be spatially and/or temporally coherent. The transmitted laser beam can be a Gaussian beam. The transmitted laser beam can be polarized, e.g. vertically polarized. The reflected laser beam can be spatially and/or temporally coherent. The reflected laser beam can be a Gaussian beam. The reflected laser beam can be polarized, e.g. vertically polarized.

The binary pseudo-random coding sequence can take values from a binary or 2-ary alphabet, e.g. $\{-1, 1\}$ or $\{0, 1\}$. The binary pseudo-random coding sequence can be generated by a linear feedback shift register. The binary pseudo-random coding sequence can be a maximum length sequence or M-sequence.

According to an implementation form, the laser transmitter is configured to transmit a blue-green laser beam in the wavelength range between 400 nm and 600 nm. Thus, the laser beam can be transmitted efficiently through water and/or fog.

The wavelength of the blue-green laser beam can be adjusted for enabling a propagation of the blue-green laser beam through water and/or fog with minimum absorption losses.

According to an implementation form, the laser transmitter is configured to transmit a laser beam having an oval-shaped laser beam cross-section. Thus, azimuth-range cells with equal resolution can be realized at long ranges.

The cross-section of the laser beam can be perpendicular with respect to the beam direction. The oval-shaped laser beam cross-section can have an elliptic shape.

According to an implementation form, the laser transmitter is configured to modulate the binary pseudo-random coding sequence by a square wave sequence to obtain the modulated laser beam. Thus, a pulsation of the laser beam can be achieved.

The square wave sequence can take values from a binary or 2-ary alphabet, e.g. $\{-1, 1\}$ or $\{0, 1\}$. The square wave sequence can be periodic. The square wave sequence can be defined by a duty cycle, e.g. 40%. The rate of the square wave sequence can be lower than the rate of the binary pseudo-random coding sequence.

According to an implementation form, the binary pseudo-random coding sequence is a GPS L2 civil moderate length sequence or a GPS L2 civil long length sequence. Thus, the binary pseudo-random coding sequence can be generated efficiently.

The GPS L2 civil moderate (L2CM) length sequence and the GPS L2 civil long (L2CL) length sequence can e.g. be generated according to the document "Interface Specification IS-GPS-200, Revision G", Global Positioning Systems Directorate, Sep. 5, 2012.

According to an implementation form, the laser transmitter is configured to modulate the laser beam by an on-off-keying modulation or an amplitude-shift-keying modulation to obtain the modulated laser beam. Thus, an efficient modulation of the laser beam can be realized.

The on-off-keying modulation can relate to switching the laser beam on and off upon the basis of a modulating sequence, e.g. the binary pseudo-random coding sequence.

The amplitude-shift-keying modulation can relate to switching the amplitude or intensity of the laser beam between different values upon the basis of a modulating sequence, e.g. the binary pseudo-random coding sequence.

According to an implementation form, the laser transmitter is configured to transmit the laser beam towards the water surface at a predetermined angle with respect to the water surface. Thus, the transmitted laser beam can enter the water surface at a predetermined range with respect to the laser detection and ranging device. Consequently, the object under the water surface can be detected upon the basis of the predetermined angle.

The predetermined angle can be a grazing angle or a slant angle. The predetermined angle can e.g. be 1°, 2°, 5°, 10°, 20°, 30°, or 45° with respect to the water surface.

According to an implementation form, the laser detector comprises a laser detecting diode or a photo multiplier for detecting the reflected laser beam. Thus, the reflected laser beam can be detected efficiently.

The laser detecting diode can be a semiconductor photo diode, e.g. an avalanche photo diode. The laser detecting diode can comprise electrical circuitry for converting the detected laser beam into an electrical signal.

The photo multiplier can be a vacuum photo tube. The photo multiplier can comprise electrical circuitry for converting the detected laser beam into an electrical signal.

According to an implementation form, the laser detector comprises an optical band-pass filter. Thus, the reflected laser beam can be separated from undesired ambient light components.

The optical band-pass filter can be configured to pass the reflected laser beam and to attenuate the undesired ambient light components.

According to an implementation form, the processor is configured to determine a time delay between transmitting the laser beam and detecting the reflected laser beam for determining a range of the object. Thus, the range of the object can be determined efficiently.

The time delay can relate to a round-trip time of the laser beam from the laser transmitter to the object and from the object to the laser detector. The time delay can e.g. be 1 μs, 2 μs, 5 μs or 10 μs.

The range of the object can relate to the distance of the object from the laser detection and ranging device. The range of the object can e.g. be determined by multiplying the time delay by the propagation speed of the laser beam and dividing by 2. The range of the object can e.g. be 150 m, 300 m, 750 m or 1.5 km.

According to an implementation form, the processor is configured to determine a range profile by correlating the transmitted laser beam and the detected laser beam in time, the range profile indicating a range of the object or the water surface. Thus, the laser beam propagation conditions can be characterized efficiently.

The correlation of the transmitted laser beam and the detected laser beam in time can relate to determining a cross-correlation function in time between the transmitted laser beam and the detected laser beam. The correlation of the transmitted laser beam and the detected laser beam in time can realize a pulse compression and/or a matched filtering.

The range profile can further indicate the range and reflectivity of further objects and/or multipath components. The time delay corresponding to the maximum value of the range profile can indicate the range of the object or the water surface.

According to an implementation form, the processor is configured to determine the range of the object or the water surface in the range profile, and the processor is further configured to detect the object upon the basis of the determined range of the object or the water surface. Thus, the object can be detected upon the basis of the determined range profile.

For determining the range of the object or the water surface, a multipath mitigation scheme, e.g. a successive cancellation scheme, can be employed. The object or the water surface can be identified in the range profile upon the basis of a correlation peak shape.

The determined range of the water surface can indicate the traveling length of the laser beam from the laser detection and ranging device to the water surface in air. The determined range of the object can indicate the traveling length of the laser beam from the laser detection and ranging device via the water surface to the object in air and water.

According to an implementation form, the processor is configured to determine a spectrum of the detected laser beam to determine absorbed or reflected laser beam wavelengths by the object. Thus, a characterization and/or identification of the object based on spectral properties of the object can be realized.

According to an implementation form, the laser detection and ranging device further comprises a motion reference unit for determining a motion of the laser detection and ranging device, wherein a beam direction of the laser beam is stabilized upon the basis of the determined motion of the laser detection and ranging device. Thus, the beam direction of the laser beam can be stabilized efficiently.

The motion reference unit can be configured to determine a roll, a pitch, and/or a heading of the laser detection and ranging device. The motion of the laser detection and ranging device can be due to a movement of the laser detection and ranging device.

The beam direction can indicate the direction of propagation of the laser beam. The beam direction can be defined by an azimuth and/or elevation with respect to the laser detection and ranging device.

The stabilization can be realized by controlling the beam direction towards a predetermined azimuth, e.g. 5°, and/or a predetermined elevation, e.g. −2°, with respect to the laser detection and ranging device.

According to an implementation form, the laser detection and ranging device is configured to scan the water surface along a horizontal plane for detecting an azimuth of the object under the water surface, or a vertical plane for detecting an elevation of the object under the water surface. Thus, the object can efficiently be detected under the water surface.

The scanning can be performed by successively directing the laser beam towards different predetermined azimuths and/or elevations.

The horizontal plane can be defined by a variable azimuth and a fixed elevation of the beam direction with respect to the laser detection and ranging device. The vertical plane can be defined by a fixed azimuth and a variable elevation of the beam direction with respect to the laser detection and ranging device.

According to an implementation form, the laser transmitter comprises a light emitting diode (LED), in particular a blue-green light emitting diode (LED), for generating a blue-green laser beam in the wavelength range between 400 nm and 600 nm. Thus, the object can be detected efficiently.

This approach can beneficially be employed for search-and-rescue purposes. The use of blue-green light, e.g. generated by the laser transmitter, can be stipulated in order to provide a 3D-imaging of the sea surface and the sea column in the maritime environment.

The laser transmitter can comprise a blue-green light emitting diode (LED) as a special case of a laser source. Blue-green LEDs can also emit within a wavelength and bandwidth of spectrum that is well suited for water penetration. The application of detecting objects in the maritime environment can be based on either a narrow beam in order to perform a scan, or a wide angle transmitter to simultaneously illuminate the whole area. This can lead to a preference of using a blue-green LED.

Advantageous can be cheaper costs, a longer operating lifetime, a simplified maintenance, a high total illumination from a solid state transmitter, no involved mechanical scanning, an easier accommodated human eye safety, an easier certification, and an application of detectors in form of commercial camera solutions. Furthermore, no fast time processing may be employed. Challenges can result from a reduced power density per spot and/or time sample which can reduce detectability for sub-zero signals due to sea clutter, no range gating capabilities, no 3D capabilities, and a need for other surface clutter rejection mechanisms.

This approach can include the concept of combined active and/or passive operation. This can mean that when the sun light is bright, the active laser can be switched off and the processing can be based on using the irradiation from the sun, e.g. instead through the same mechanisms.

According to an implementation form, the processor is configured to detect an oil slick, a dispersed oil spill, or a gas leakage upon the basis of the reflected laser beam. Thus, a monitoring of the maritime surrounding can be provided efficiently.

According to an aspect, the invention relates to a laser detection and ranging method for detecting an object under a water surface, the laser detection and ranging method comprising modulating a laser beam by a binary pseudo-random coding sequence to obtain a modulated laser beam, transmitting the modulated laser beam towards the water surface, detecting a reflected laser beam, the reflected laser beam forming a reflected version of the transmitted laser beam, and detecting the object under the water surface upon the basis of the reflected laser beam.

The laser detection and ranging method can be performed by the laser detection and ranging device. Further features of the laser detection and ranging method can directly result from the functionality of the laser detection and ranging device.

The invention can be implemented in hardware and/or software.

BRIEF DESCRIPTION OF THE DRAWINGS

Further implementation forms of the invention will be described with respect to the following figures, in which.

DETAILED DESCRIPTION OF THE DRAWINGS

Figure 1:
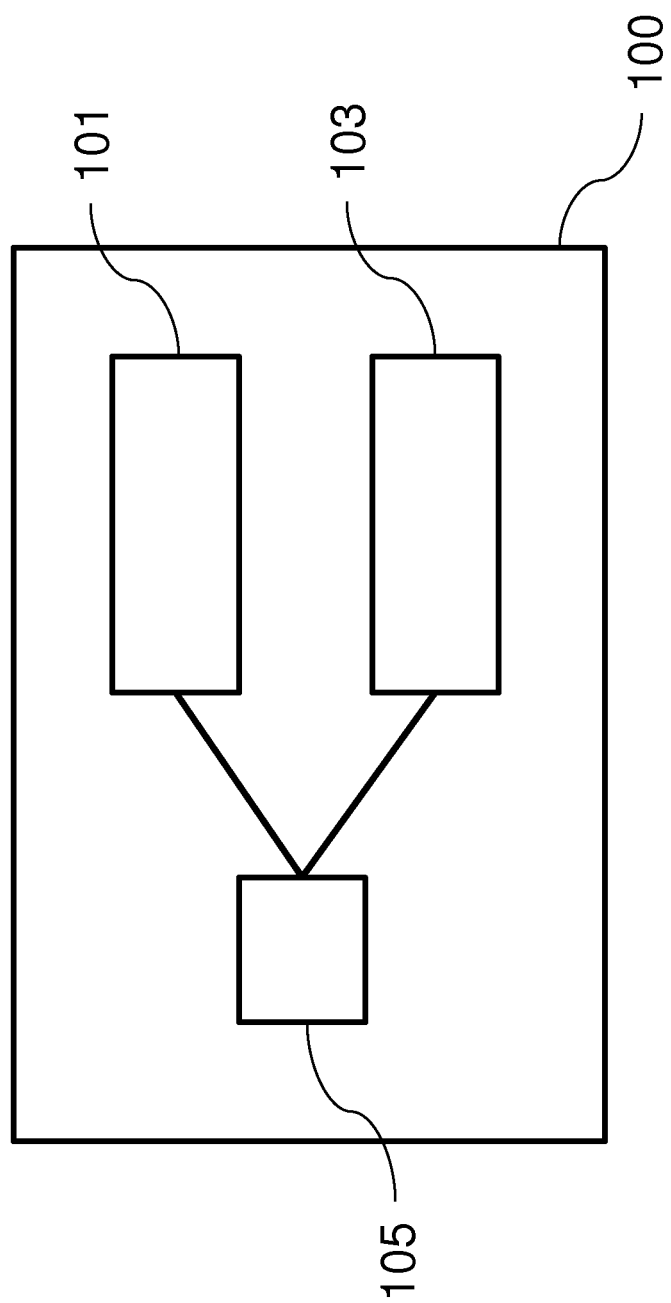
FIG. 1 shows a schematic diagram of a laser detection and ranging device for detecting an object under a water surface according to an implementation form.

FIG. 1 shows a schematic diagram of a laser detection and ranging device 100 for detecting an object under a water surface according to an implementation form.

The laser detection and ranging device 100 comprises a laser transmitter 101 being configured to modulate a laser beam by a binary pseudo-random coding sequence to obtain a modulated laser beam, and to transmit the modulated laser beam towards the water surface, a laser detector 103 for detecting a reflected laser beam, the reflected laser beam forming a reflected version of the transmitted laser beam, and a processor 105 for detecting the object under the water surface upon the basis of the reflected laser beam.

The laser detection and ranging device 100 can be mounted on a marine seagoing vessel, e.g. a ship, or a marine stand-still platform, e.g. an oil production platform. The laser detection and ranging device 100 can further be installed at a marine harbor or marine port.

The object can be a submarine obstacle. The water surface can be defined as the surface layer between water and air.

The laser transmitter 101 can be a solid state laser, e.g. a neodymium-doped yttrium aluminum garnet (Nd:YAG) laser. The laser transmitter 101 can further be a dye laser or a gas laser. The laser transmitter 101 can comprise a non-linear optical element, e.g. for frequency doubling. The laser transmitter 101 can operate at an infrared frequency band, an optical frequency band, or an ultraviolet frequency band. The laser transmitter 101 can comprise a laser, in particular a blue-green laser, for generating the laser beam.

The laser detector 103 can be a semiconductor-based laser detector or a tube-based laser detector. The laser detector 103 can be configured to convert the detected laser beam into an electrical signal.

The processor 105 can be programmably arranged to detect the object under the water surface upon the basis of the reflected laser beam.

The transmitted laser beam can be spatially and/or temporally coherent. The transmitted laser beam can be a Gaussian beam. The transmitted laser beam can be polarized, e.g. vertically polarized. The reflected laser beam can be spatially and/or temporally coherent. The reflected laser beam can be a Gaussian beam. The reflected laser beam can be polarized, e.g. vertically polarized.

The binary pseudo-random coding sequence can take values from a binary or 2-ary alphabet, e.g. $\{-1, 1\}$ or $\{0, 1\}$. The binary pseudo-random coding sequence can be generated by a linear feedback shift register. The binary pseudo-random coding sequence can be a maximum length sequence or M-sequence.

Figure 2:
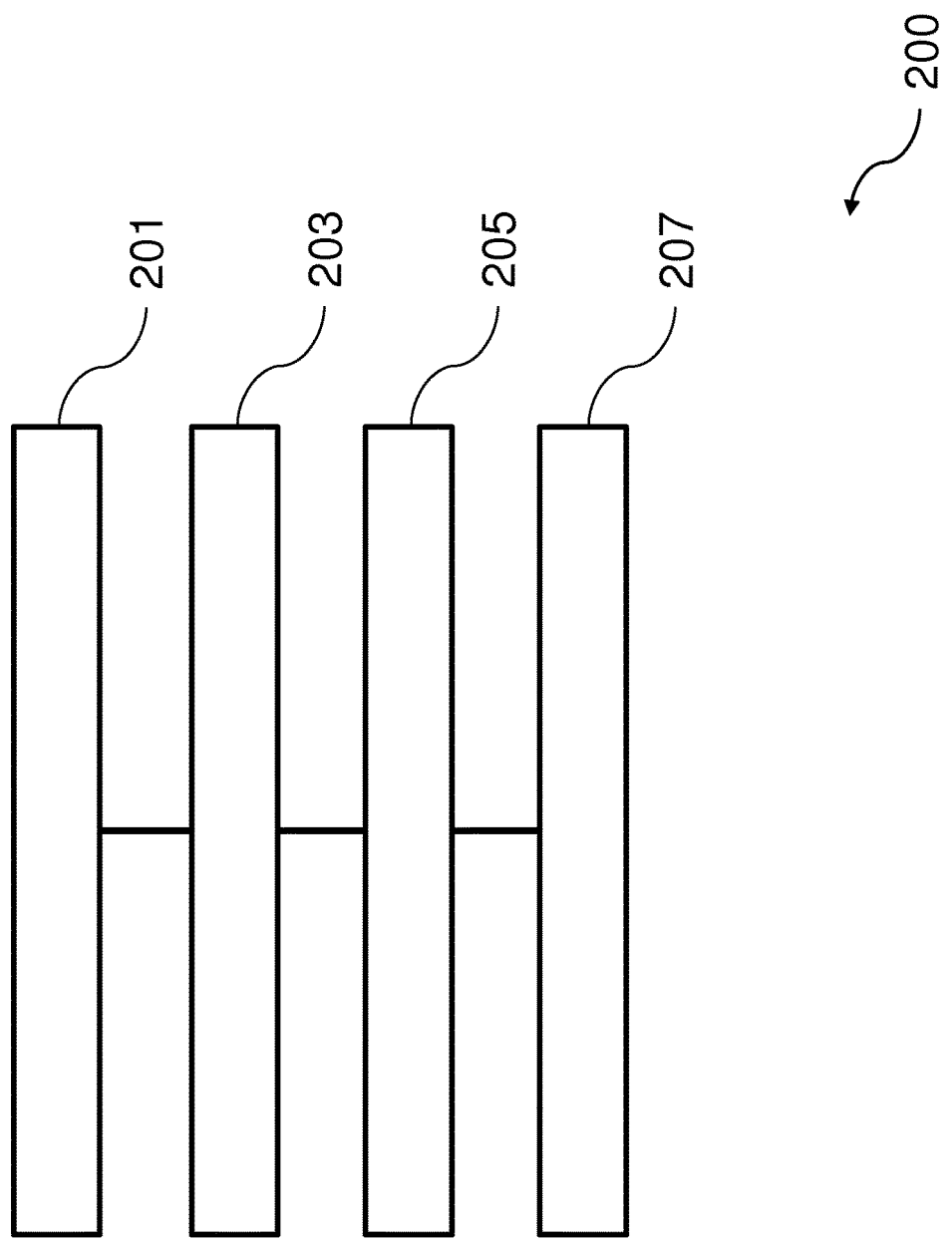
FIG. 2 shows a schematic diagram of a laser detection and ranging method for detecting an object under a water surface according to an implementation form.

FIG. 2 shows a schematic diagram of a laser detection and ranging method 200 for detecting an object under a water surface according to an implementation form.

The laser detection and ranging method 200 comprises modulating 201 a laser beam by a binary pseudo-random coding sequence to obtain a modulated laser beam, transmitting 203 the modulated laser beam towards the water surface, detecting 205 a reflected laser beam, the reflected laser beam forming a reflected version of the transmitted laser beam, and detecting 207 the object under the water surface upon the basis of the reflected laser beam.

The laser detection and ranging method 200 can be performed by the laser detection and ranging device. Further features of the laser detection and ranging method 200 can directly result from the functionality of the laser detection and ranging device.

Figure 3:
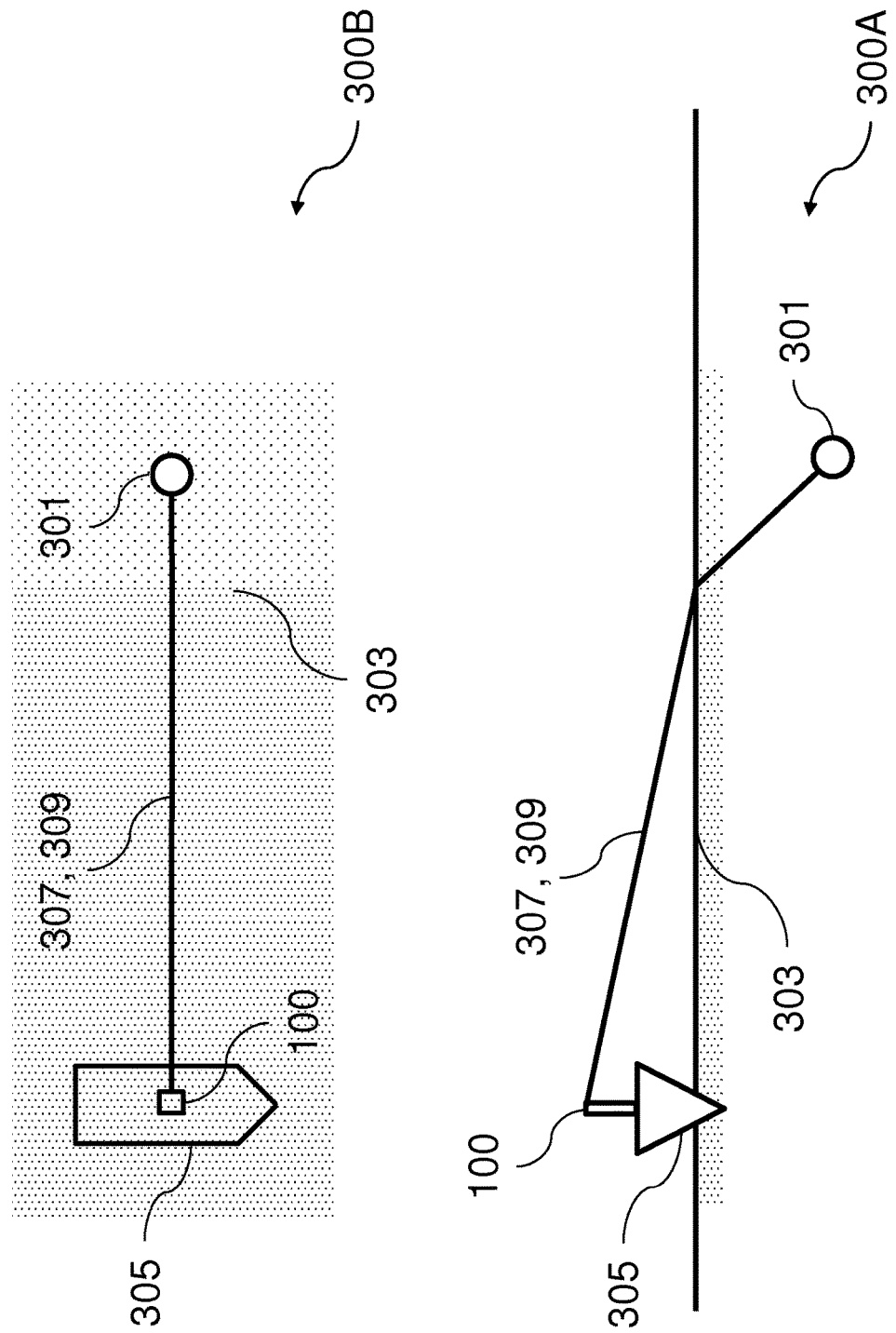
FIG. 3 shows two schematic diagrams of a detection scenario for detecting an object under a water surface according to an implementation form.

FIG. 3 shows two schematic diagrams 300A, 300B of a detection scenario for detecting an object 301 under a water surface 303 according to an implementation form.

The two diagrams 300A, 300B comprise the object 301, the water surface 303, a marine seagoing vessel 305, a transmitted laser beam 307, and a reflected laser beam 309. The laser detection and ranging device 100 is mounted on the marine seagoing vessel 305. The transmitted laser beam 307 is directed from the laser detection and ranging device 100 towards the object 301. The reflected laser beam 309 is directed from the object 301 towards the laser detection and ranging device 100. The diagram 300A illustrates the detection scenario from a side view. The diagram 300B illustrates the detection scenario from a top view.

The object 301 can be a submarine obstacle.

The water surface 303 can be defined as the surface layer between water and air.

The marine seagoing vessel 305 can e.g. be a ship.

The transmitted laser beam 307 can be spatially and/or temporally coherent. The transmitted laser beam 307 can be a Gaussian beam. The transmitted laser beam 307 can be polarized, e.g. vertically polarized.

The reflected laser beam 309 can be spatially and/or temporally coherent. The reflected laser beam 309 can be a Gaussian beam. The reflected laser beam 309 can be polarized, e.g. vertically polarized.

The object 301 can be detected under the water surface 303 according to the laser detection and ranging method. The laser detection and ranging method comprises modulating a laser beam 307 by a binary pseudo-random coding sequence to obtain a modulated laser beam 307, transmitting the modulated laser beam 307 towards the water surface 303, detecting a reflected laser beam 309, the reflected laser beam 309 forming a reflected version of the transmitted laser beam 307, and detecting the object 301 under the water surface 303 upon the basis of the reflected laser beam 309.

Figure 4:
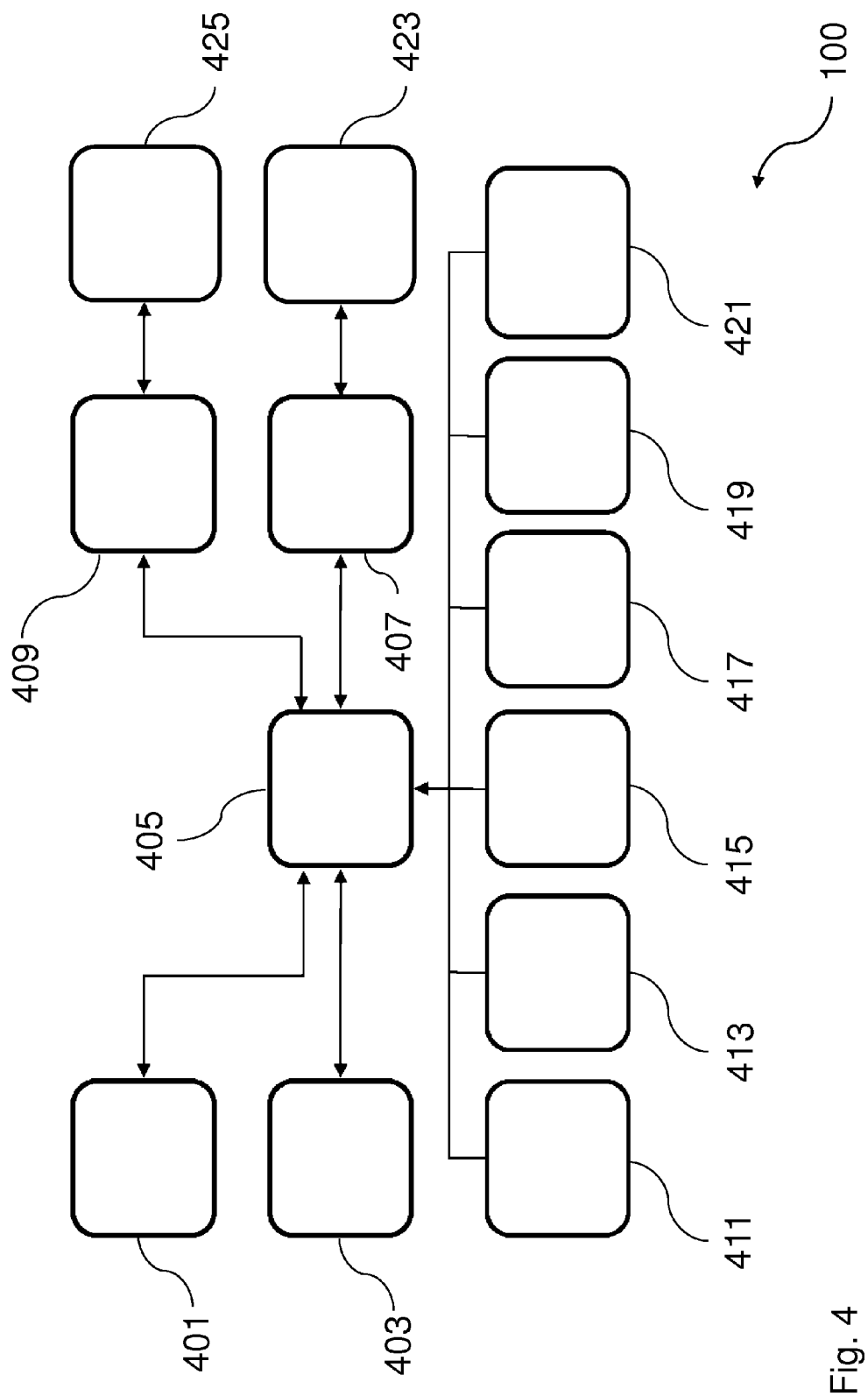
FIG. 4 shows a schematic diagram of subsystems of a laser detection and ranging device for detecting an object under a water surface according to an implementation form.

FIG. 4 shows a schematic diagram of subsystems of a laser detection and ranging device 100 for detecting an object under a water surface according to an implementation form.

The laser detection and ranging device 100 can be used to provide ocean surface layer observations.

The laser detection and ranging device 100 comprises a sensor unit 401, a sensor unit 403, a data processor unit 405, a display unit 407, a system console unit 409, a radar unit 411, a radar unit 413, a gyro unit 415, a GPS unit 417, an AIS unit 419, and a compass unit 421. The laser detection and ranging device 100 is operated by a system operator 423 and is configured by a system engineer 425.

The laser detection and ranging device 100 comprises four subsystems: The sensor units 401, 403 as optical instrumentation that enables observations with high resolution at or under the sea surface, the data processor unit 405 as a data processor that processes data from the sensor units and combines the data with data from existing sensors such as radar, the display unit 407 as an operator display that can present the information from the optical instrument and the data processor in an operator-friendly way, and the system console unit 409 as a computer used to configure the laser detection and ranging device 100.

The figure gives a schematic overview of the relationship between the subsystems. The subsystems can be connected to ship sensor systems, such as the radar unit 411, the radar unit 413, the gyro unit 415, the GPS unit 417, the AIS unit 419, and the compass unit 421. The data processor unit 405 is connected to the ship sensors as a passive listener. The system console unit 409 and the display unit 407 can use the existing ship communication network to connect to the data processor unit 405.

The number of sensor units, display units, system console units and radar units can vary. The display unit can use an existing display sharing system on the bridge, so the system can be visible from several consoles on the bridge.

In an implementation form, only one sensor unit is used, and the data processor unit uses only a single radar unit.

Figure 5:
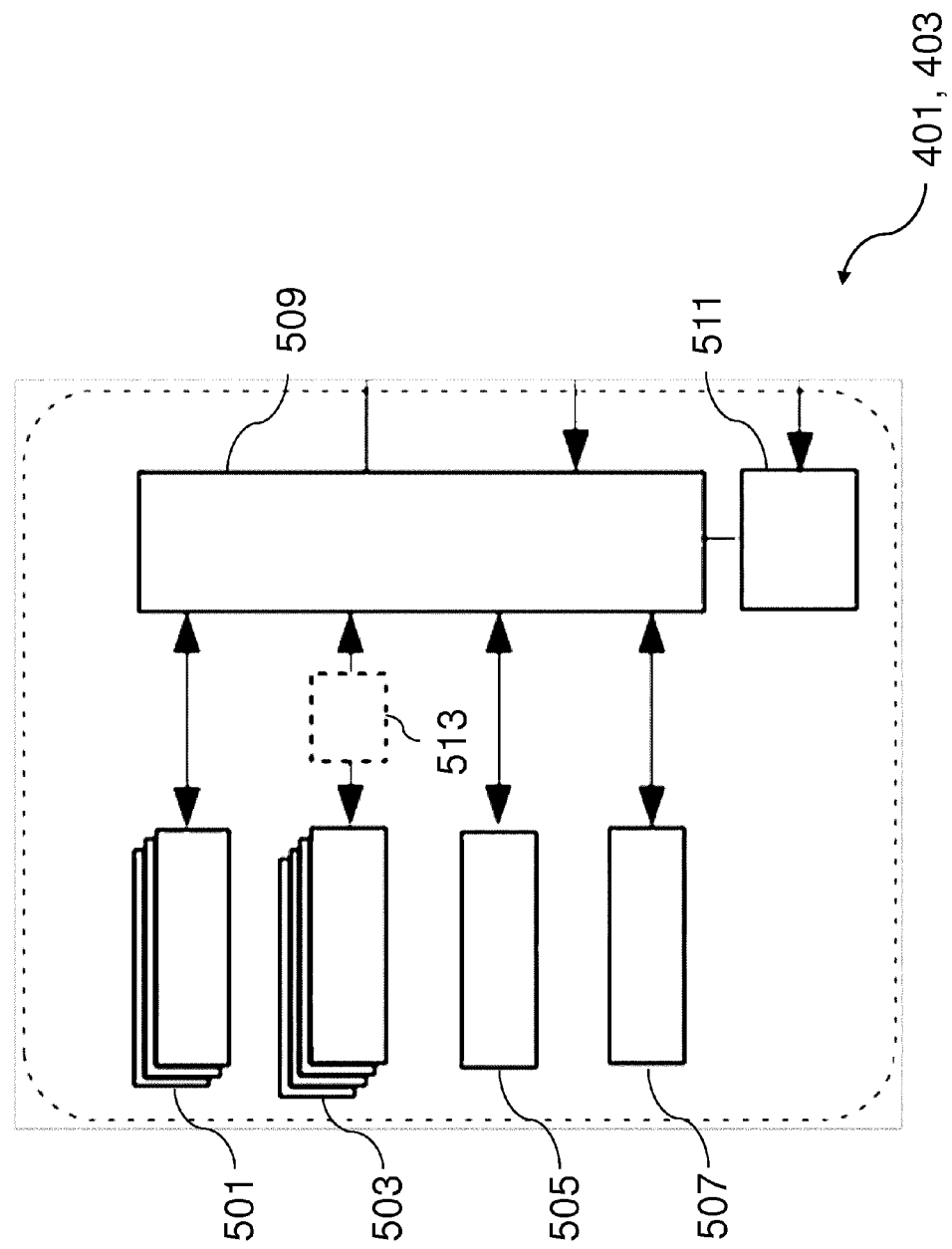
FIG. 5 shows a schematic diagram of a sensor unit of a laser detection and ranging device for detecting an object under a water surface according to an implementation form.

FIG. 5 shows a schematic diagram of a sensor unit 401, 403 of a laser detection and ranging device for detecting an object under a water surface according to an implementation form.

The sensor unit 401, 403 comprises a laser unit 501, an auxiliary sensor unit 503, a mechanical scan unit 505, a real-time motion reference unit 507, a real-time control unit 509, a power supply unit 511, and an A/D conversion unit 513.

The sensor unit 401, 403 comprises a set of sensors that measure the environment of the ship. The following sensors can e.g. be used: a blue-green laser, and/or an optical camera. This instrument can provide the capability to observe objects at or under the sea surface at a resolution better than radar.

In addition, the sensor unit 401, 403 can have a motion reference unit (MRU) that measures vibrations, attitude and accelerations. The vibration measurements can be used to correct the reported angles at which measurements were taken, and attitude and acceleration are reported to the data processor unit which can use this information to convert sensor unit measurements to a Cartesian Ship-Centered Frame to fuse the sensor unit data with the data from other instruments.

Figure 6:
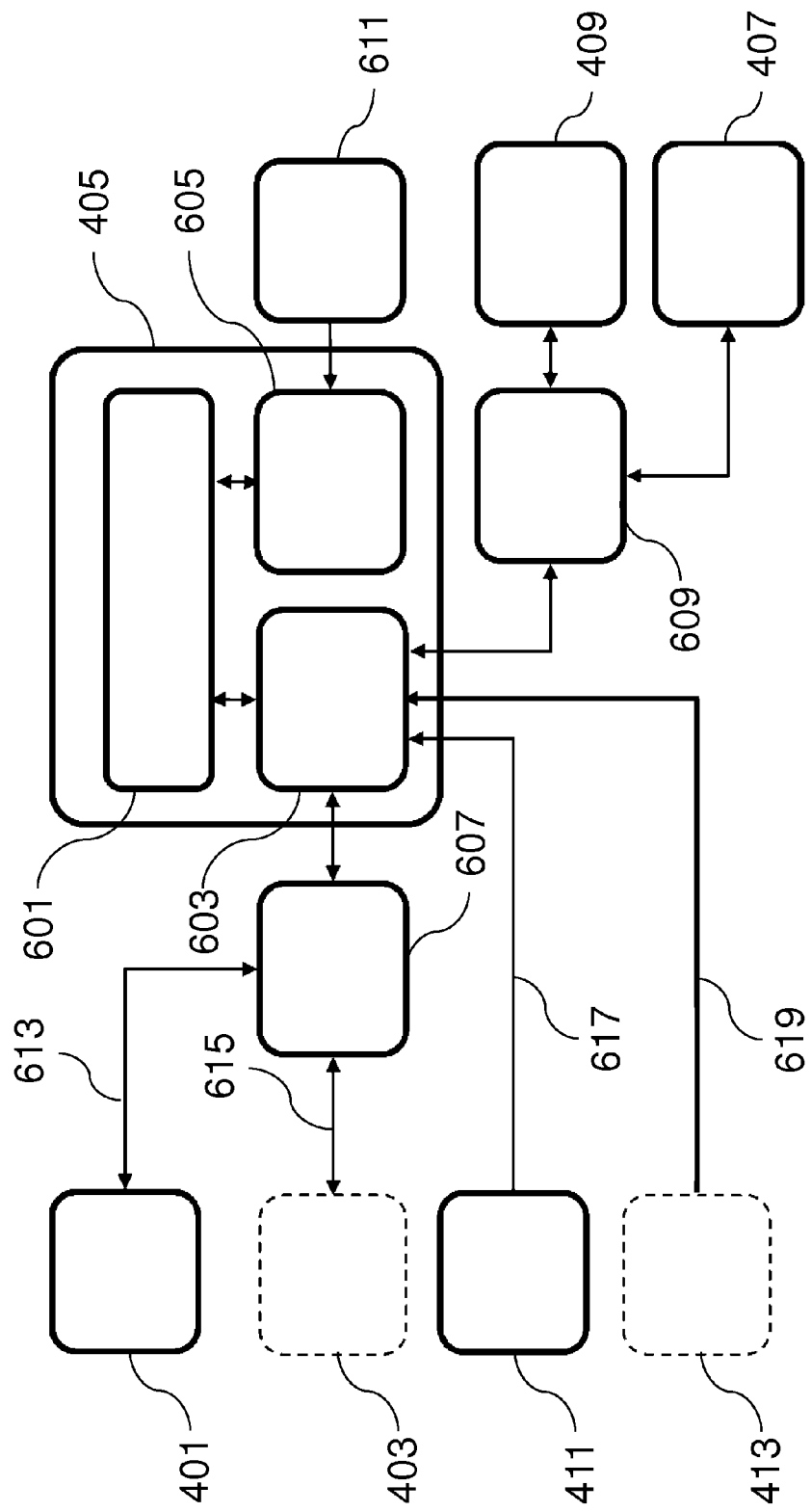
FIG. 6 shows a schematic diagram of a data processor unit of a laser detection and ranging device for detecting an object under a water surface according to an implementation form.

FIG. 6 shows a schematic diagram of a data processor unit 405 of a laser detection and ranging device for detecting an object under a water surface according to an implementation form. The diagram illustrates the interfaces of the data processor unit 405.

The data processor unit 405 comprises a data processor core unit 601, an Ethernet network card unit 603, and a serial interface unit 605.

The Ethernet network card unit 603 is connected to a Fiber/Ethernet switch unit 607. The Fiber/Ethernet switch unit 607 is connected to a sensor unit 401 via a data, monitoring and control signal line 613. The Fiber/Ethernet switch unit 607 is further connected to a sensor unit 403 via a data, monitoring and control signal line 615.

The Ethernet network card unit 603 is further connected to a radar unit 411 via an observation signal line 617, and to a radar unit 413 via an observation signal line 619.

The Ethernet network card unit 603 is further connected to a bridge switch unit 609. The bridge switch unit 609 is connected to a display unit 407 and a system console unit 409.

The serial interface unit 605 is connected to a ship sensor unit 611.

The data processor unit 405 processes the data of the sensor units 401, 403 and the data of the ship sensors. The data processor unit 405 comprises the following hardware units: a core system where the processing related to the main functionality takes place, an Ethernet switch with ports for fiber optic cables, a radar slave junction box to create a passive connection to the radar and the other ship sensors, a radar digitizer, and a network serial interface to connect to the ship sensors.

The data processor unit 405 can work autonomously, and can be configured and monitored via a system console unit 409. The data processor unit 405 performs the following processing: read measurements by the ladar and visual band camera of each sensor unit 401, 403 and convert these to a point cloud with position relative to the ship, read measurements by the onboard radar units 411, 413, e.g. a top mast X-band radar and convert these to a point cloud with position relative to the ship, convert measurements of sensor units 401, 403 and ship's radar units 411, 413 to the same reference, perform clustering and tracking to distinguish objects from noise, perform additional analysis and characterization, if possible, on detected objects, and report results to the display unit 407 for display to the end user.

Figure 7:
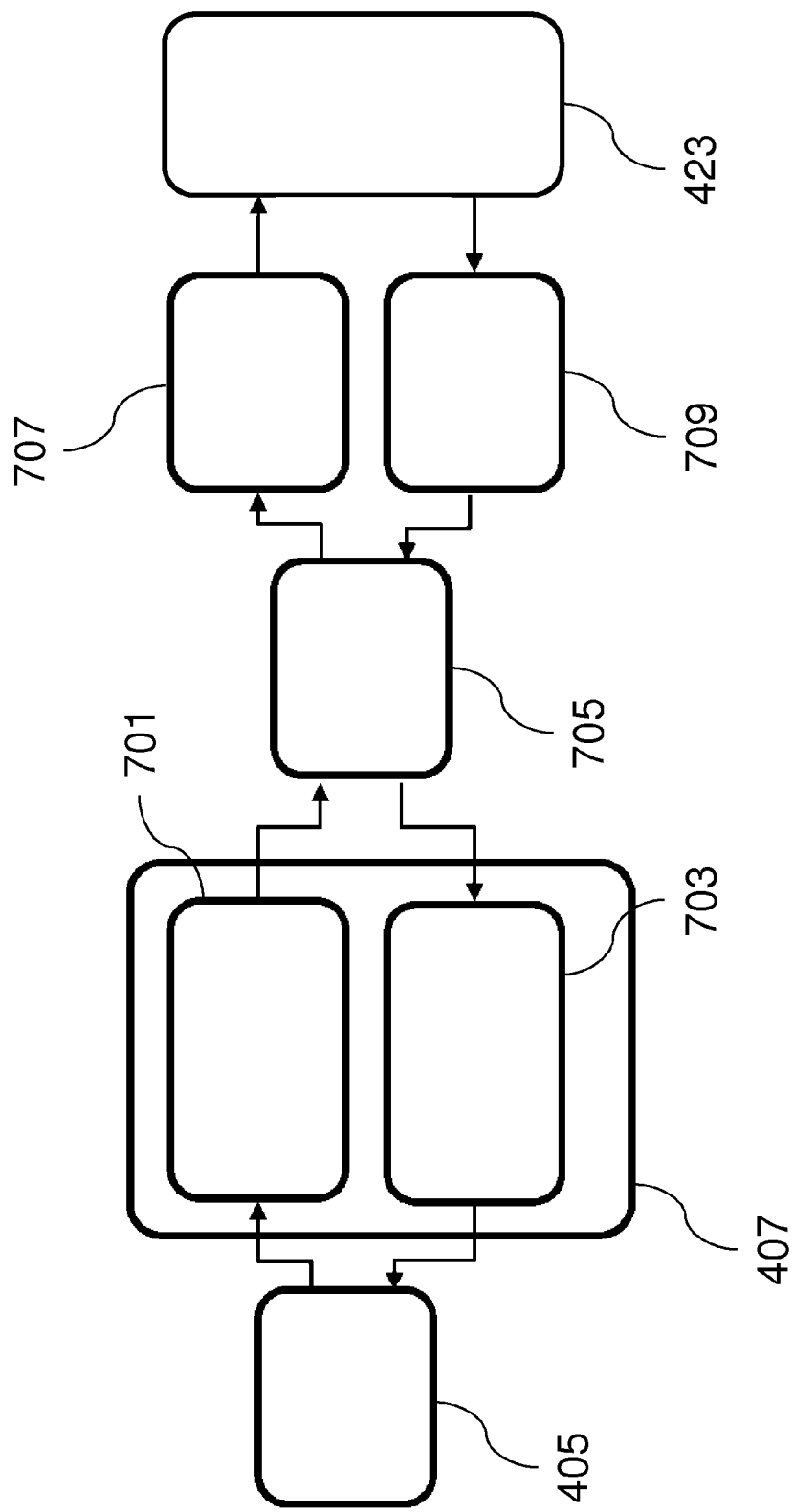
FIG. 7 shows a schematic diagram of a display unit of a laser detection and ranging device for detecting an object under a water surface according to an implementation form.

FIG. 7 shows a schematic diagram of a display unit 407 of a laser detection and ranging device for detecting an object under a water surface according to an implementation form.

The display unit 407 comprises a visualization unit 701, and an interaction unit 703.

The visualization unit 701 and the interaction unit 703 are connected to a data processor unit 405. The visualization unit 701 and the interaction unit 703 are further connected to a keyboard-video-mouse switch unit 705.

The keyboard-video-mouse switch unit 705 is connected to a display unit 707 and a mouse unit 709. The display unit 707 and the mouse unit 709 are operated by a system operator 423.

The display unit 407 can be the interface between the system and the operator, which can be a captain, a first officer, a pilot or anybody who is interested in the information made available by the system. The bridge can be equipped with a screen sharing system, which comprises several computers and several displays, connected via the keyboard-video-mouse (KVM) switch 705.

Each of the displays 707 can e.g. select one of four computers to connect with. The display unit 407 can be a computer that is connected to the system so that the output of the system can be viewed on several screens. Additionally, a separate computer, e.g. a laptop, can be used. Integration with an existing bridge system such as a conning station or an ECDIS can be realized.

One or more displays, with optional mouse input, can be connected to the display unit 407 via the keyboard-video-mouse (KVM) switch unit 705.

Figure 8:
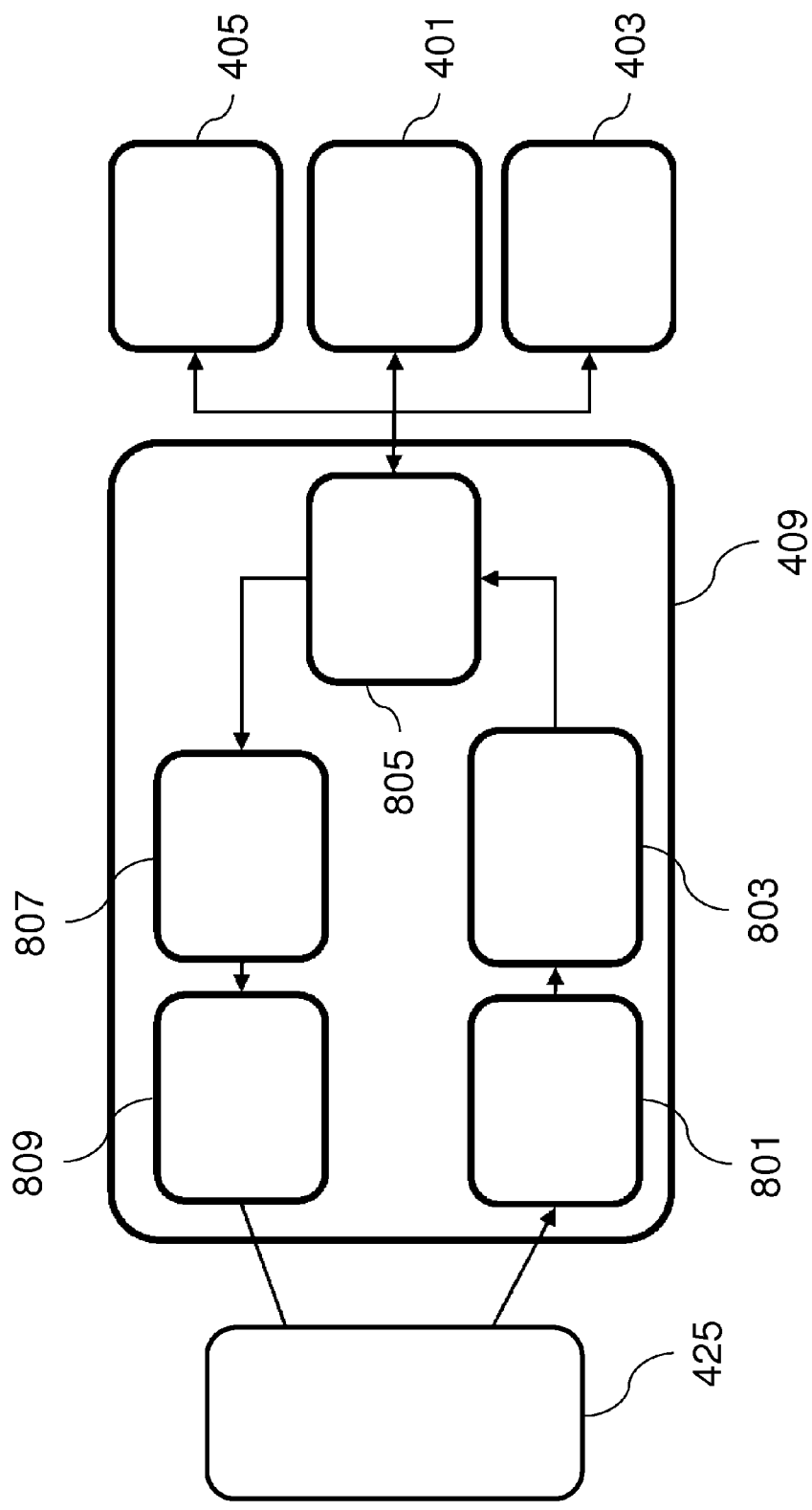
FIG. 8 shows a schematic diagram of a system console unit of a laser detection and ranging device for detecting an object under a water surface according to an implementation form.

FIG. 8 shows a schematic diagram of a system console unit 409 of a laser detection and ranging device for detecting an object under a water surface according to an implementation form.

The system console unit 409 comprises a keyboard-mouse-touch unit 801, a command generator unit 803, a network card unit 805, a display control unit 807, and a display unit 809.

The network card unit 805 is connected to a sensor unit 401, a sensor unit 403, and a data processor unit 405. The keyboard-mouse-touch unit 801 and the display unit 809 are operated by a system engineer 425.

The system console unit 409 can be used to control the sensor units 401, 403 and the data processor unit 405. It provides a technical view of the inner functionality of the sensor units 401, 403 and it can be used to change modes and settings of each. This functionality can be integrated with the operator display unit 407.

The system console unit 409 can be used to incidentally configure the system. Once this is done, operating the instrument can happen via the display unit 407. The target user of the system console unit 409 can be an engineer, not a navigation officer or captain.

The system console unit 409 can be used to control both the data processor unit 405 as well as the sensor units 401, 403. The communication to the sensor units 401, 403 can be routed via the data processor unit 405.

Figure 9:
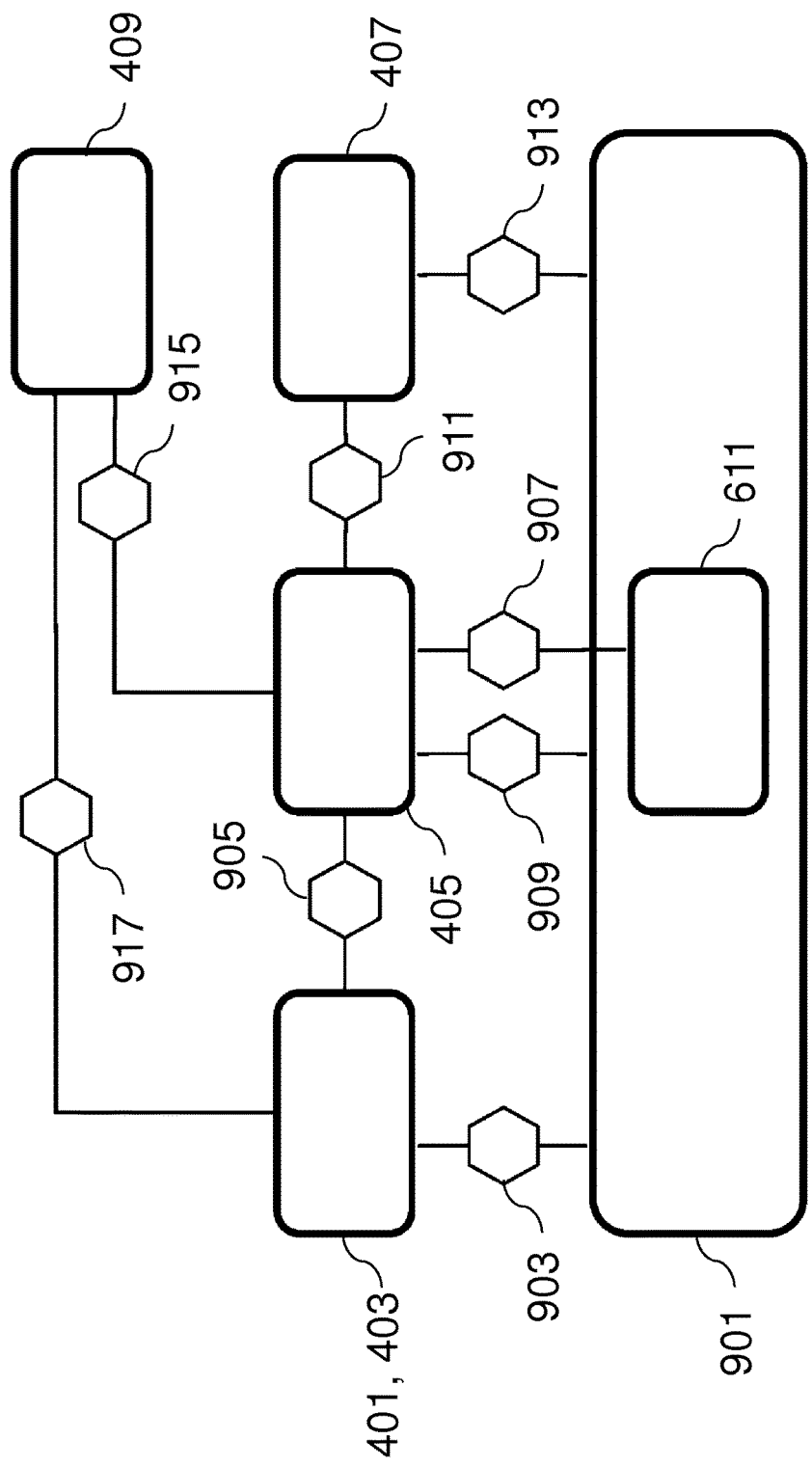
FIG. 9 shows a schematic diagram of interfaces of a laser detection and ranging device for detecting an object under a water surface according to an implementation form.

FIG. 9 shows a schematic diagram of interfaces 903, 905, 907, 909, 911, 913, 915, 917 of a laser detection and ranging device for detecting an object under a water surface according to an implementation form. The diagram comprises a sensor unit 401, 403, a data processor unit 405, a display unit 407, a system console unit 409, a ship sensor unit 611, and a ship structure 901.

The interface 903 connects the sensor unit 401, 403 to the ship structure 901. This interface illustrates the way that the sensor unit 401, 403 is mounted on the ship. The interface 903 comprises electrical power cables, e.g. 230 VAC, 60 Hz, and a network fiber optic cable to the network. The fiber optic cable can be of multimode type, e.g. core/cladding diameter of 62.5/125 µm, terminated with connector type SC on the sensor unit 401, 403 end and LC on the data processor unit 405 end.

The interface 905 connects the sensor unit 401, 403 to the data processor unit 405. The sensor units 401, 403 can connect to the data processor unit 405 via a LAN network. The sensor units 401, 403 can provide data via the LAN using a specific protocol for the data and commands. Time synchronization can be done using the Network Time Protocol (NTP). The data rate of the link between sensor unit 401, 403 and the data processor unit 405 can be 1 Gbps. The LAN can be implemented as a fiber-optic network and separated from the existing ship network. The sensor unit 401, 403 provides the following information for each shot: power-delay profiles in CPICF, a pointing direction of the laser at the time of firing, a time of measurement in microseconds since some epoch, and at regular intervals a current best estimate of parameters describing yaw/pitch/roll and surge/sway/heave.

The interface 907 connects the data processor unit 405 to the ship sensor unit 611. Two types of data of radar signals can be available: the navigational messages and the analog video signal. The navigational messages of the radar and other ship sensors, e.g. time information, position, and heading, can be made available by a navigation device using a network serial interface. This device can provide one or more serial lines, e.g. at a maximum data rate of 38.4 kbps each, that contain NMEA-0183 messages. The analog video signal can be provided via a navigation device slave junction box. A scan streamer can read the radar video and data signals, and converts these into digital messages made available to the data processor unit 405 via an Ethernet port. There can e.g. be three radar systems of which the system can receive information: a bow radar, a mast radar, and/or a stern radar. However, only one radar can be used. This radar can have adequate properties regarding field of view, resolution, and height. The radar can be a top X-band radar e.g. with 1 cm resolution and 360° view.

The interface 909 connects the data processor unit 405 to the ship structure 901. The data processor unit 405 can be a server system. The form factor can vary. The data processor unit 405 can e.g. be a wall-mountable system. Furthermore, an Ethernet switch can be mounted. A fiber optic cable from the sensor unit 401, 403 can be available, e.g. using connector type LC. Furthermore, electrical power, e.g. 24 VDC or 100 to 240 VAC, can be available. Also, a network cable for the network connection on which the display unit 407 and the system console unit 409 are connected, can be available. Also, the signals from the navigation device slave junction box for the radar video signal and the serial lines from the navigation device network serial interface can be available.

The interface 911 connects the data processor unit 405 to the display unit 407. The data processor unit 405 can connect to the operator display unit 407 via a network cable. The protocol between the data processor unit 405 and the display unit 407 can be a specific protocol with open NMEA-0183 or NMEA-2000 sentences. In addition, there can be HTTP traffic for instrument control.

The interface 913 connects the display unit 407 to the ship structure 901. The operator display unit 407 can be a laptop. A network cable can be used to facilitate a connection from the data processor unit 405 to the operator display unit 407.

The interface 915 connects the system console unit 409 to the data processor unit 405. There are different possible realizations for the operator console: the operator console can e.g. be a separate laptop, or the operator console can be a special mode of the operator display unit 407, where a full computer keyboard can be available for the user. The operator console does not need to be in use all the operational time. A surface for the computer keyboard can be available in range of the keyboard connector, or can be available for a laptop with network connection. Therefore, the data processor unit 405 can be reached. The system console unit 409 can be integrated with the display unit 407. The display unit 407 can also comprise a web browser that can be used to perform maintenance tasks and diagnostics.

The interface 917 connects the system console unit 409 to the sensor unit 401, 403. The system console unit 409 or operator console can be used to control the sensor units 401, 403 and the data processor unit 405. This can involve sending commands to the sensor units 401, 403 to change modes or settings and retrieving housekeeping data. The protocol between the system console unit 409 or operator console and the sensor units 401, 403 can be based on a specific protocol. The communication between the system console unit 409 or operator console and the sensor units 401, 403 can be routed via the data processor unit 405, because it can be the data processor unit 405 to which the sensor units 401, 403 are connected, e.g. using a fiber-optic network.

The following coordinate frames can be used: an uncompensated polar instrument-centered frame (UPICF) wherein coordinates are round trip time and uncorrected laser pointing angles, e.g. azimuth and elevation, with respect to the fixed instrument, a compensated polar instrument-centered frame (CPICF) wherein coordinates are range and laser pointing angles, e.g. azimuth and elevation, with respect to the fixed instrument and corrected for vibrations measured by the sensor unit 401, 403, a Cartesian ship-centered frame (CSCF) wherein coordinates are Cartesian with the origin in the center of the ship, and wherein X can be forward, Y can be in starboard direction and Z can be positive downward, an earth-centered inertial frame (ECIF) wherein coordinates are Cartesian with the origin at the center of the earth, and/or a latitude longitude altitude (LLA) frame wherein coordinates are latitude and longitude in fractional degrees, e.g. according to WGS84, and altitude is with respect to the local geoid.

A conversion between coordinate frames can be performed. In order to process the information from the sensor unit 401, 403, which can be provided as a power-delay profile measured in a particular direction with respect to the sensor unit 401, 403, it can be converted to the Cartesian ship-centered frame (CSCF), so that it can be compared with radar measurements which can also be converted to this frame.

The conversion from UPICF to CPICF can take place on the sensor unit 401, 403. The following steps can be involved: convert from mirror angle to angle with respect to the sensor unit 401, 403 wherein instrument geometrical parameters can be input, correct for vibrations wherein measurements from a motion reference unit (MRU) can be input, convert round trip time into range with respect to a reference point in the sensor unit 401, 403 wherein instrument calibration parameters can be input. The sensor unit measurements can be sent to the data processor unit 405 in CPICF.

A conversion from CPICF to CSCF can be performed. The data processor unit 405 can receive sensor unit and radar measurements in CPICF, with the origin at some reference point in each of the instruments. These measurements can first be converted to a common Cartesian ship-centered frame (CSCF) so that the results can be combined. This can be done using the following steps: shift the reference point from the sensor unit/radar center to the ship center wherein instrument locations with respect to the ship center can be input, convert attitude relative to the instrument to attitude with respect to the ship horizontal wherein instrument orientation can be input, convert attitude with respect to the ship to attitude with respect to the local horizon wherein roll, pitch and yaw angles of the ship from an MRU and/or a ship gyro can be input, convert from polar coordinates azimuth, elevation and range to Cartesian coordinates with the ship as origin, e.g. with X is forward, Y is starboard direction, Z is downward, and shift to the average ship center by correcting for heave, surge and sway wherein heave, surge and sway movement of the ship from an MRU and/or ship GPS can be input.

A conversion from CSCF to ECI can be performed. To convert from CSCF to ECI, the ship position obtained from a GPS can be used.

A conversion from ECI to LLA can be performed. Some NMEA sentences can present locations in latitude/longitude/altitude (LLA) coordinates. Using e.g. a WGS84 coordinate system definition, the LLA coordinates can be converted to ECI and the other way around.

Figure 10:
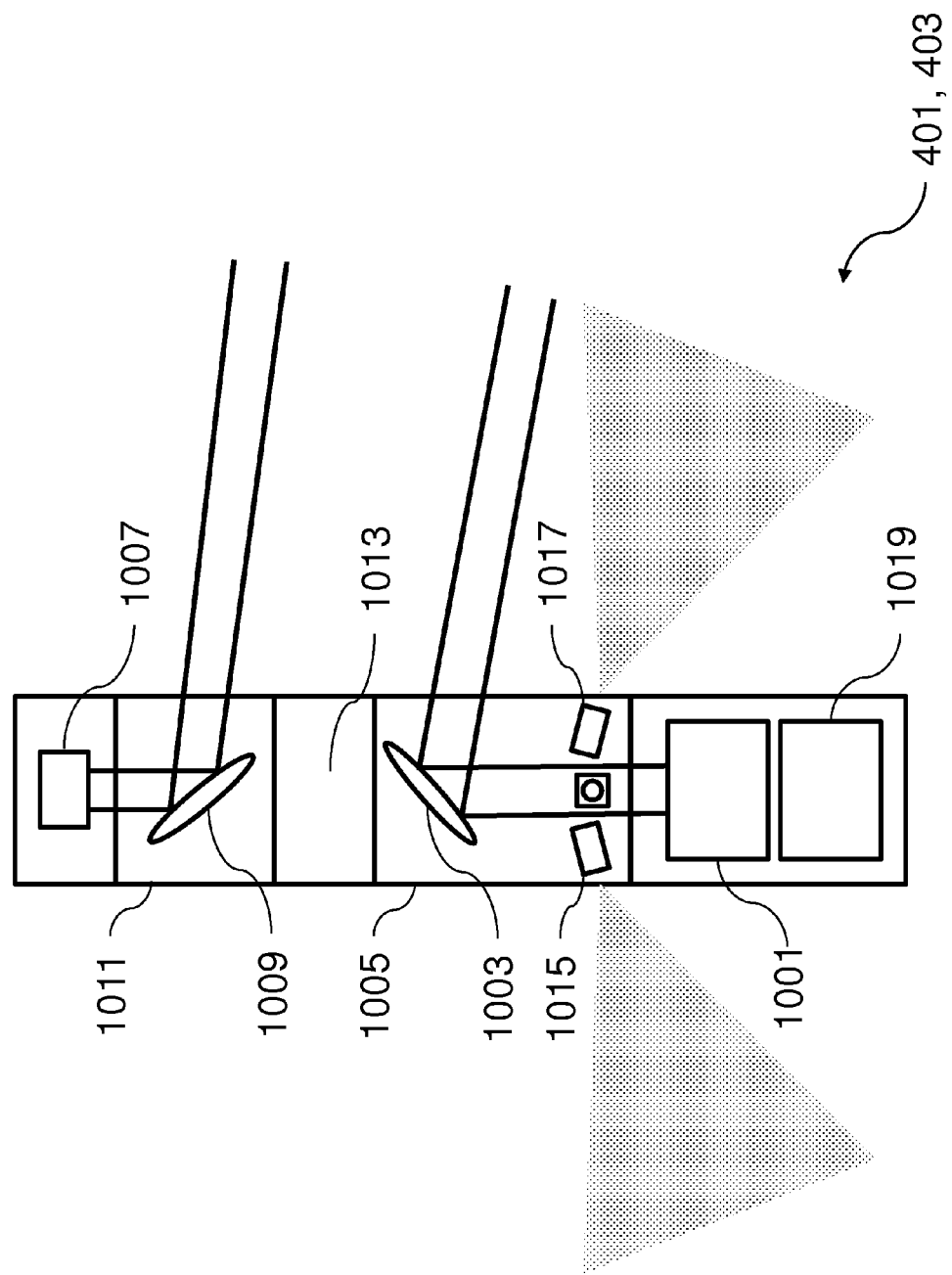
FIG. 10 shows a schematic diagram of sensor components of a sensor unit according to an implementation form.

FIG. 10 shows a schematic diagram of sensor components of a sensor unit 401, 403 according to an implementation form.

The sensor unit 401, 403 comprises a ladar unit 1001, a visual mirror 1003, a visual window 1005, an IR/BIL unit 1007, an IR mirror 1009, an IR window 1011, a mirror drive unit 1013, a cam unit 1015, a cam unit 1017, and a control, IMU and power unit 1019.

The sensor unit 401, 403 can comprise the following set of sensors in the sensor pod.

Firstly, a CCD visual band imager can be included in the sensor unit 401, 403. This can be placed in a circular structure to provide omnidirectional visibility from the sensor.

Secondly, a ladar unit can be included in the sensor unit 401, 403. The ladar unit can comprise a laser transmitter and beam shaping optics, receiving optics and multiple detection channels. Separate systems can provide high sensitivity, long range window and matrix detection of the scene. A mirror or prism based precision pointing system can control the beam.

Thirdly, an infrared active and passive imager can be included in the sensor unit 401, 403. This unit can provide high magnification, long range target detection and imaging. The unit can use an active near IR waveform to provide long range all-weather classification and a medium wave IR waveform for long range passive detection. This part of the system can be seen as an adjunct sensor to the ladar.

The unit can also comprise a processing and interface unit that can provide local system control and high throughput local sensor processing. An onboard motion reference unit (IMU) can provide location and attitude data. The motion sensor data can be used to provide correction data or to dynamically stabilize the pointing of the sensor.

The mechanical design of the system can be implemented to provide a robust and nonintrusive design, with the ability to withstand any environmental condition.

The mechanical system and the optical apertures comprise a self-supporting vertical cylinder with two optical apertures, one cylindrical aperture for the visible band, e.g. 400-800 nm, and one separate cylindrical aperture for the infrared band, e.g. 1200 nm-6000 nm. The optical apertures can have the following specifications: the external surface can be water and contamination resistant having an optical quality surface, the internal surface can be non-reflective coated having an optical quality surface, and the mechanical strength can resist environments and bird strikes.

The ladar system can operate in the blue-green part of the spectrum and can provide data for surface and subsurface imaging. Key specifications can be: a wavelength in the region 480 nm-600 nm, a solid state laser technology, a pulse energy of 1-10 mJ per pulse, a pulse length of 3 ns nominal, controllable 1 ns-100 ns, and a pulse repetition frequency of nominally 10 kHz, in the region 5 kHz-50 kHz. A first detector can be characterized by a high sensitivity time series recording, a sampling speed of min. 300 MHz, and a dynamic range of min. 90 dB. A second detector can comprise a very high sensitivity photomultiplier and can provide a single range cell. A third detector can comprise a monochrome high resolution imager. A fourth detector can optionally be hyper-spectral or a line array.

The visual band imager can provide a continuous coverage around the ship. Key specifications can be: a CMOS imager having a resolution of 1920×1080 or better, an orthonormal lens providing a horizontal coverage of 109 degrees, and a specific data output.

The infrared imager can be optional. Key specifications can be: a scanning area of 360 degrees azimuth, +20 degrees to −45 degrees elevation, two simultaneous modes with active 1500 nm and passive 5000 nm infrared, at 1500 nm with a sector of observation of 1.5×1.5 degrees, at 5000 nm with a sector of observation of 15×15 degrees, and a specific data output.

The scanning mirror system can provide a capability for continuous scanning and target tracking. Key specifications can be: a mirror dimension to support 15 cm beam envelope, scan modes comprising step azimuth with swing vertical, step vertical with swing azimuth, and slew to position, a specific scan velocity, a scan accuracy of e.g. 1 mrad, and IMU reference modes comprising a free scan with IMU tagging, and an IMU slewed scan.

The navigation and inertial reference can measure the movement of the platform in order to compensate for the ship movement. It can cover the following directions: pitch, roll, and heave.

The heading can also be relevant in the system, but the change of heading can be considered to be so slow that the ship compass can be used. Since the sensor update rate is min. 1 Sec., the most critical parameter can be considered to be the dynamic pitch, roll and heave measurement.

Key specifications can be: a heave range of ±2M, a heave accuracy of ±0.2M with 1 sec. repeatability, a pitch range of ±5°, a pitch accuracy of ±0.025° with 1 sec. repeatability, a pitch angular rate of ±1°/sec, a roll range of ±5°, a roll accuracy of ±0.025° with 1 sec. repeatability, and a roll angular rate of ±0.5°/sec.

Figure 11:
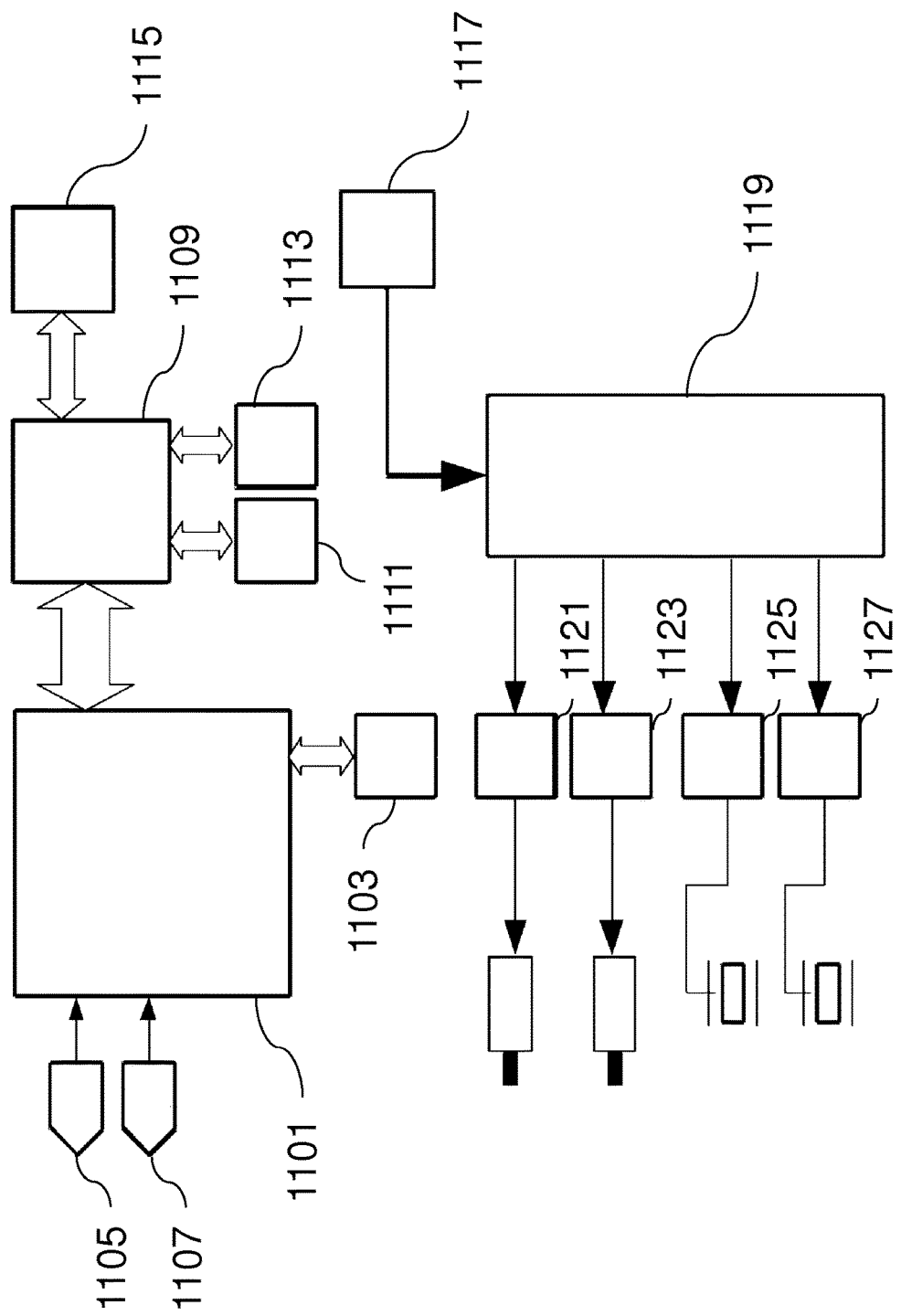
FIG. 11 shows a schematic diagram of processing components of a sensor unit according to an implementation form.

FIG. 11 shows a schematic diagram of processing components of a sensor unit according to an implementation form.

The processing components comprise an FPGA unit 1101, a RAM unit 1103, an A/D conversion unit 1105, an A/D conversion unit 1107, a CPU unit 1109, a RAM unit 1111, a FLASH unit 1113, an Ethernet unit 1115, an IMU unit 1117, a scan controller unit 1119, a step motor drive unit 1121, a step motor drive unit 1123, a piezo drive unit 1125, and a piezo drive unit 1127.

The ladar processing system can handle sensor near processing such as ping averaging, digital filtering, and/or vibration correction. In addition, the processing system can control the scan motion of the mirror system.

Figure 12:
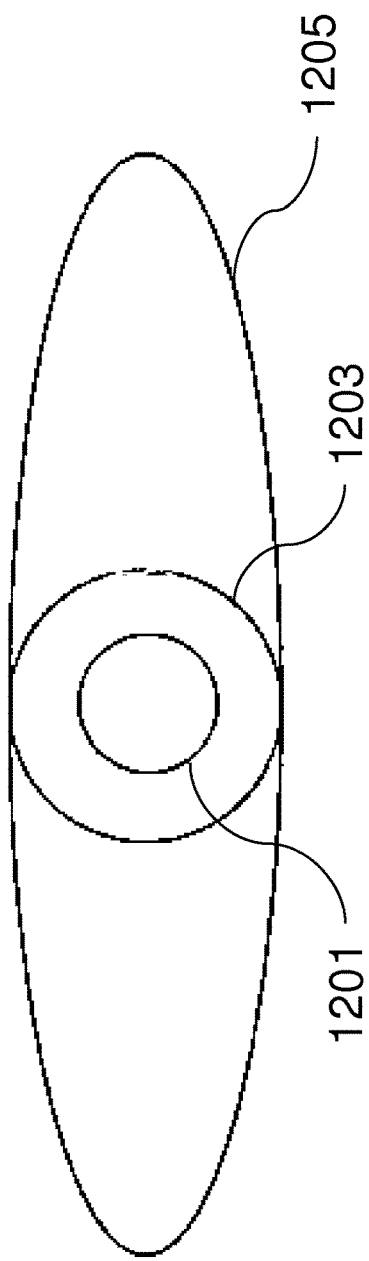
FIG. 12 shows a schematic diagram of a cross-section of a laser beam according to an implementation form.

FIG. 12 shows a schematic diagram of a cross-section of a laser beam according to an implementation form.

The diagram comprises a cross-section of an ideal circular laser beam 1201, a cross-section of a divergent circular laser beam 1203 at range, and a cross-section of an asymmetrically divergent oval laser beam 1205 at range.

The laser generation unit can be based on a Q switched Nd:YAG laser emitting 532 nm wavelength light. This approximate wavelength is desirable as light in this region of the spectrum, i.e. blue-green in color, can pass through water with little attenuation, allowing an illumination of objects below the water surface. The wavelength of the system can also be altered from 532 nm to 488 nm. This small shift towards blue light can allow the system to more easily penetrate water.

The sensor unit optics can provide a balance of system output power, detector performance, and eye safety. The method by which both eye safety and detection performance are obtained is through the use of large beam spreading and light collecting optics, respectively. To increase the amount of light power which can be emitted while remaining eye safe, a collimator can be used to spread the beam and thus lower the energy density and therefore the risk of eye damage.

Similarly, detection performance can be improved by gathering a larger surface area of returned light energy, and focusing this onto the detector surface. Also, a dividing baffle can be employed that can physically isolate transmit and receive optical paths to maximize detector performance. While the use of a coded detection waveform can also reduce a crosstalk hazard, a careful optical path design can be advantageous to the system performance.

While common laser systems can be calibrated by use of a visible light camera in the optical path of the laser, and since the laser in the sensor unit can be capable of low power continuous wave emission, the calibration can be carried out by observing the beam intersect point remotely, allowing an elimination of the weight of a prism and a camera from a mobile portion of the optics assembly.

While it can be possible to increase both the output beam diameter and input detector aperture, both of these parameters can be based on larger optical assemblies, which in turn limit the speed with which the optics may be scanned. The sensor unit can have fixed output optics, or can be designed to scan up to 1000 spatial points per second.

While the use of a collimated beam at this power level with a 50 mm divergence can remain below the maximum permissible exposure limits (MPEs), e.g. specified in iec60825-1 ed. 2.0, it can be desirable to also provide a provision for accidental viewing of the beam with aiding optics such as binoculars. To this end, the beam can be imparted with an asymmetric divergence. This can both improve the eye safety of the system while also providing a nearly circular beam footprint when this shape is projected onto the water surface at range.

The sensor unit can e.g. emit 130 mJ of energy in a 15 ns pulse over a surface area of 3.1e-5 square meters. The sensor unit can also spread its energy over a much larger surface area as well as a much longer duration. By emitting e.g. 200 mW of 50% duty cycle light over 1 ms on a surface area of 2.0e-3 square meters, the system can have a short term energy density, i.e. energy per unit surface area, of $2.8 \times 10e8$ lower over 15 ns, while also imparting 77% of the energy of the sensor unit system over a 1 ms period. Due to a pulse repetition rate (PRF) limit of e.g. 30 Hz, it can be advantageous to employ very high power individual pulses, while a modulated diode of the sensor unit can permit to use many lower power and much less hazardous pulses, while also performing more measurements per second.

The sensor unit can use a time gated ranging concept to detect targets at differing ranges. The sensor unit can also use advanced signal processing to allow a simultaneous measurement of multiple range hypotheses, as well as to allow operation at a lower power level by making multiple less intense illuminations of the same target.

A code modulation and a ranging peak detection scheme can be applied. For this purpose, sampling and triggering components of the system can be used. The triggering process can be performed by a modulator, a laser, a photodiode, and a digitizer combination.

A pseudo-random sequence of +/−1 can be used to modulate the laser. A high auto-correlation suppression characteristic of the modulating or spreading waveform can be desirable. An improvement in SNR can indicate a high achievable cross-correlation suppression of the system. A noise floor raised by the signal itself can indicate an auto-correlation suppression. A correlation peak can show multiple environmental reflections. An artificially increased level of noise floor can be due to a high SNR signal with finite cross-correlation suppression.

The detection of the laser return waveform can be accomplished by an avalanche photodiode (APD), specially designed to be sensitive to the blue-green laser light used by the transmitting laser, as well as to have a wide bandwidth, e.g. 530 MHz nominal. The wide sensor bandwidth can allow the high bandwidth diode laser to produce a sharp correlation or detection peak, which in turn can allow for a precision of up to 30 cm in the determination of range to target.

To augment the situational awareness provided by the sensor unit, the system can be fitted with multiple visible band cameras. These can serve the dual purpose of providing a potential for a human readable overlay to detected objects, as well as potentially augmenting detection of threats during daylight conditions. An infrared system, such as a burst illumination system, can further be employed for surface target detection.

The laser beam can be modulated using a general spread spectrum modulation for laser range finding. The modulation can be characterized by the following general characteristics. The laser beam modulation can be based on an advanced time coded modulation scheme for optimum range resolution and target detection clutter suppression. The modulation scheme can achieve a maximum range performance by having a very high duty cycle and a very high processing gain. The modulation scheme can be structured to give a maximum suppression of external disturbance, e.g. light disturbance. The modulation can also be structured to cancel any close up effects.

The laser beam can be implemented as follows. The laser beam can be stabilized to operate with a very narrow bandwidth. The laser beam can be modulated with a very high rate, e.g. 25 MHz up to more than 200 MHz. The modulation can be an on off modulation, optionally an amplitude shift modulation can be used for enhanced mean power. A minimum side-lobe spreading code can be used. The spreading code can be long enough to provide a unique code for the total range swath, e.g. more than 10000 chips. The spreading code can be superimposed a low rate, e.g. typically 10 kHz, square wave modulation wherein a duty cycle can be less than 50%, e.g. typically 40%. This modulation can be matched filtered in the receiver with a resulting range sensitivity curve adjusted to provide a desired range sensitivity profile.

Additionally, the following features can be used. A highly concentrated laser beam to give positive SNR ratio to allow for efficient integration can be utilized. A very high precision stabilization can be utilized to allow for dual mode ranging through range and elevation measurement. Very asymmetrical laser beams can be utilized for optimum target detection at a slant angle. Specific angle and/or scan patterns for target detection, e.g. a carpet mode, a range only mode, a sector mode, etc. can be used.

Figure 13:
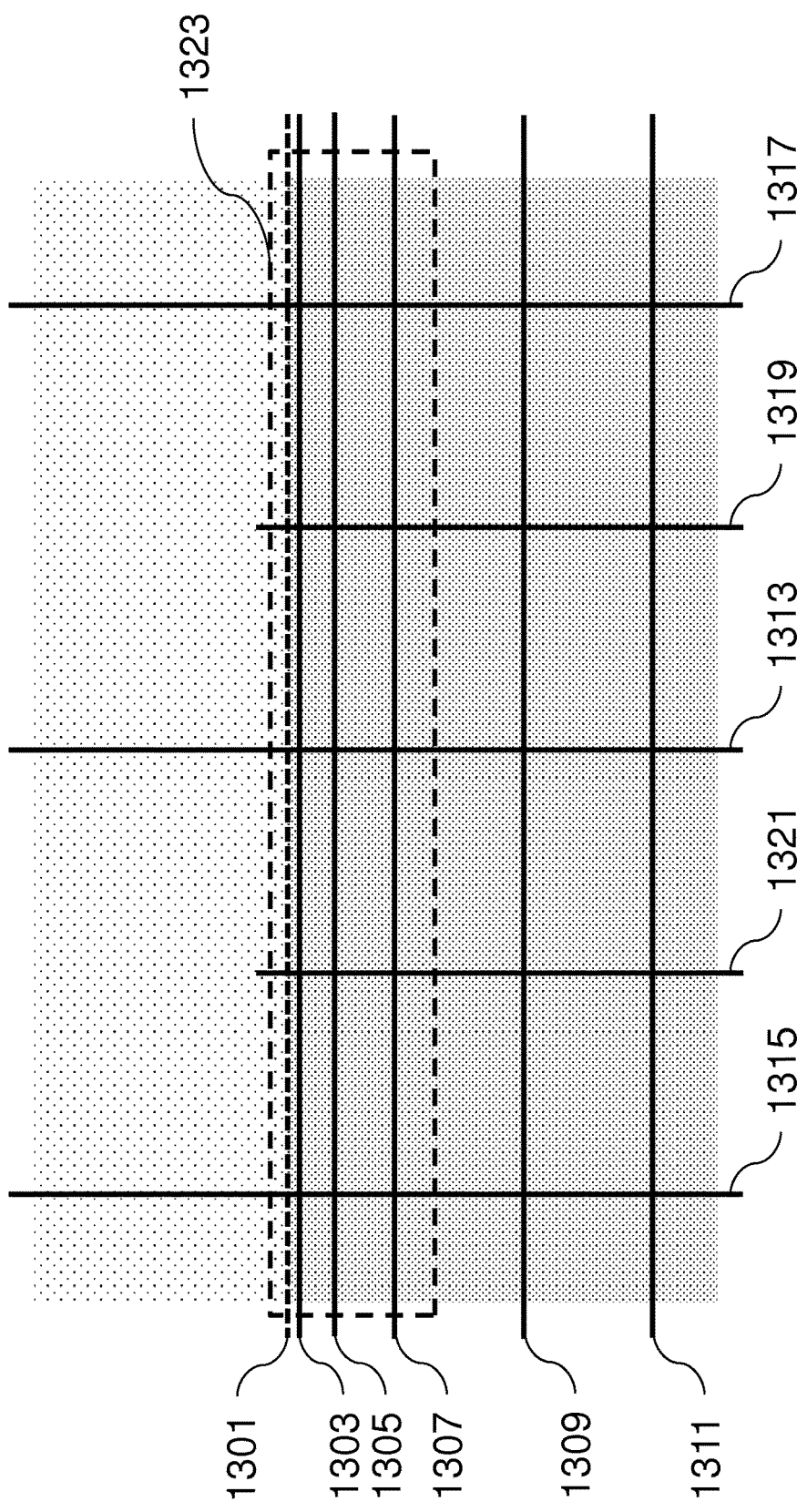
FIG. 13 shows a schematic diagram of a radar coverage area of a sensor unit according to an implementation form.

FIG. 13 shows a schematic diagram of a radar coverage area 1323 of a sensor unit according to an implementation form.

The diagram further comprises a horizon line 1301, an elevation line 1303, an elevation line 1305, an elevation line 1307, an elevation line 1309, an elevation line 1311, a front direction line 1313, an aft direction line 1315, a further aft direction line 1317, a starboard direction line 1319, and a port direction line 1321.

The elevation line 1303 can relate to an elevation of −0.9 degrees and/or a range of 2 km. The elevation line 1305 can relate to an elevation of −1.7 degrees and/or a range of 1 km. The elevation line 1307 can relate to an elevation of −3.4 degrees and/or a range of 500 m. The elevation line 1309 can relate to an elevation of −16 degrees and/or a range of 100 m. The elevation line 1311 can relate to an elevation of −45 degrees and/or a range of 30 m.

The front direction line 1313, the aft direction line 1315, the further aft direction line 1317, the starboard direction line 1319, and the port direction line 1321 can indicate an azimuth.

The interface to the onboard navigation radar or radars can provide a general situation awareness and detection of surface targets. The navigation radar can be able to detect targets in a 360 degrees sector, and with a range coverage from about 300 m to a limit depending on the radar height, target size and environmental condition, e.g. to a 20-30 km range.

An extractor can be part of a central data fusion system, and data from this extractor can be used to provide a data general situation awareness picture, and to cue the sensor unit for target confirmation and specific target investigation.

Figure 14:
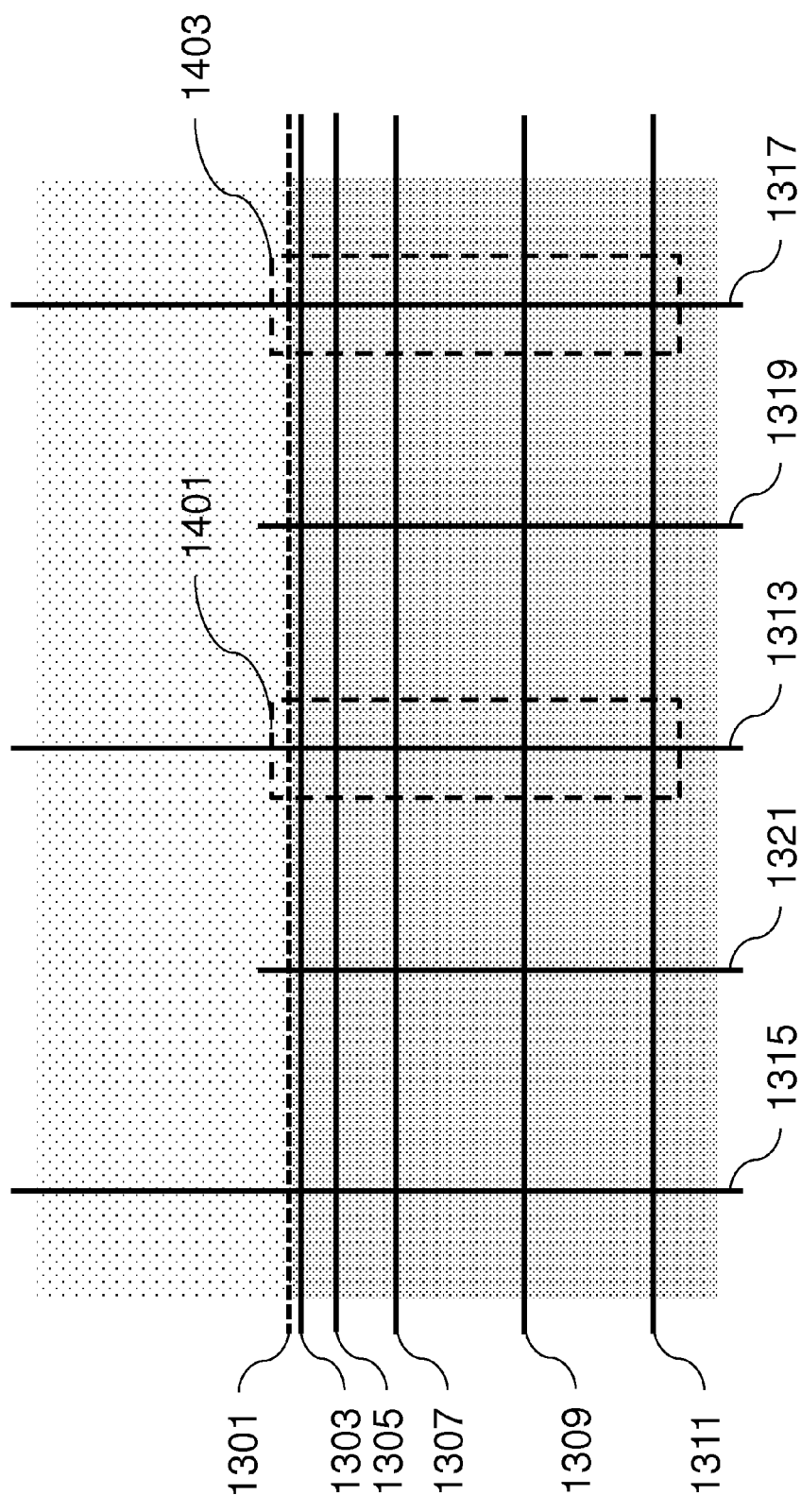
FIG. 14 shows a schematic diagram of a ladar coverage area of a sensor unit according to an implementation form.

FIG. 14 shows a schematic diagram of a ladar coverage area 1401, 1403 of a sensor unit according to an implementation form. The ladar coverage area 1401 can relate to the front. The ladar coverage area 1403 can relate to the aft.

The diagram further comprises a horizon line 1301, an elevation line 1303, an elevation line 1305, an elevation line 1307, an elevation line 1309, an elevation line 1311, a front direction line 1313, an aft direction line 1315, a further aft direction line 1317, a starboard direction line 1319, and a port direction line 1321.

The elevation line 1303 can relate to an elevation of −0.9 degrees and/or a range of 2 km. The elevation line 1305 can relate to an elevation of −1.7 degrees and/or a range of 1 km. The elevation line 1307 can relate to an elevation of −3.4 degrees and/or a range of 500 m. The elevation line 1309 can relate to an elevation of −16 degrees and/or a range of 100 m. The elevation line 1311 can relate to an elevation of −45 degrees and/or a range of 30 m.

The front direction line 1313, the aft direction line 1315, the further aft direction line 1317, the starboard direction line 1319, and the port direction line 1321 can indicate an azimuth.

The ladar system can have the capability to scan a predetermined sector or predetermined sectors for detecting surface and/or subsurface targets. During normal forward moving operation of the ship or vessel, a forward looking mode can be utilized to scan for targets in the forward path of the ship.

The forward looking mode can scan within a narrow sector, e.g. 20 degrees, from a short range looking down in front of the ship to a maximum range determined by the environmental conditions and settings of the operator. Under optimal conditions and when looking for very shallow targets, a forward looking range of up to 2 km can be used.

When two sensor units are used on the ship, a separate front and aft looking sector may be employed or activated.

Figure 15:
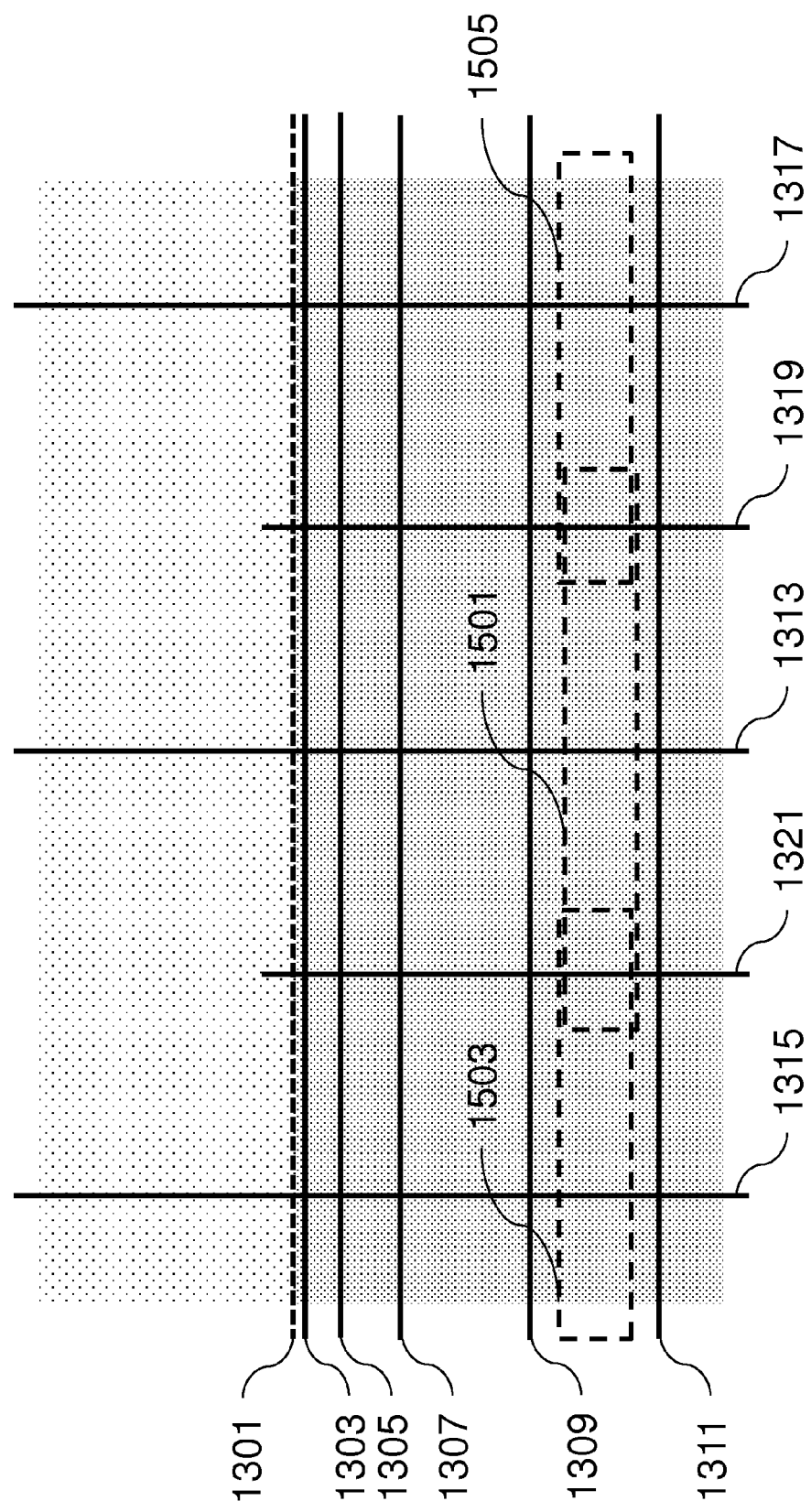
FIG. 15 shows a schematic diagram of a ladar coverage area of a sensor unit according to an implementation form.

FIG. 15 shows a schematic diagram of a ladar coverage area 1501, 1503, 1505 of a sensor unit according to an implementation form. The ladar coverage area 1501, the ladar coverage area 1503, and the ladar coverage area 1505 can realize an omnidirectional coverage around a ship.

The diagram further comprises a horizon line 1301, an elevation line 1303, an elevation line 1305, an elevation line 1307, an elevation line 1309, an elevation line 1311, a front direction line 1313, an aft direction line 1315, a further aft direction line 1317, a starboard direction line 1319, and a port direction line 1321.

The elevation line 1303 can relate to an elevation of −0.9 degrees and/or a range of 2 km. The elevation line 1305 can relate to an elevation of −1.7 degrees and/or a range of 1 km. The elevation line 1307 can relate to an elevation of −3.4 degrees and/or a range of 500 m. The elevation line 1309 can relate to an elevation of −16 degrees and/or a range of 100 m. The elevation line 1311 can relate to an elevation of −45 degrees and/or a range of 30 m.

The front direction line 1313, the aft direction line 1315, the further aft direction line 1317, the starboard direction line 1319, and the port direction line 1321 can indicate an azimuth.

In port or when having emphasis on ship security, a round-scanning mode of the system can be activated. This can scan the active laser beam in a perimeter mode around the vessel. The range at which this scan can be performed can be determined by a target depth detection setting. For deepest laser penetration, the perimeter can be set as close to the vessel as possible. This can also be determined by an installation location.

Figure 16:
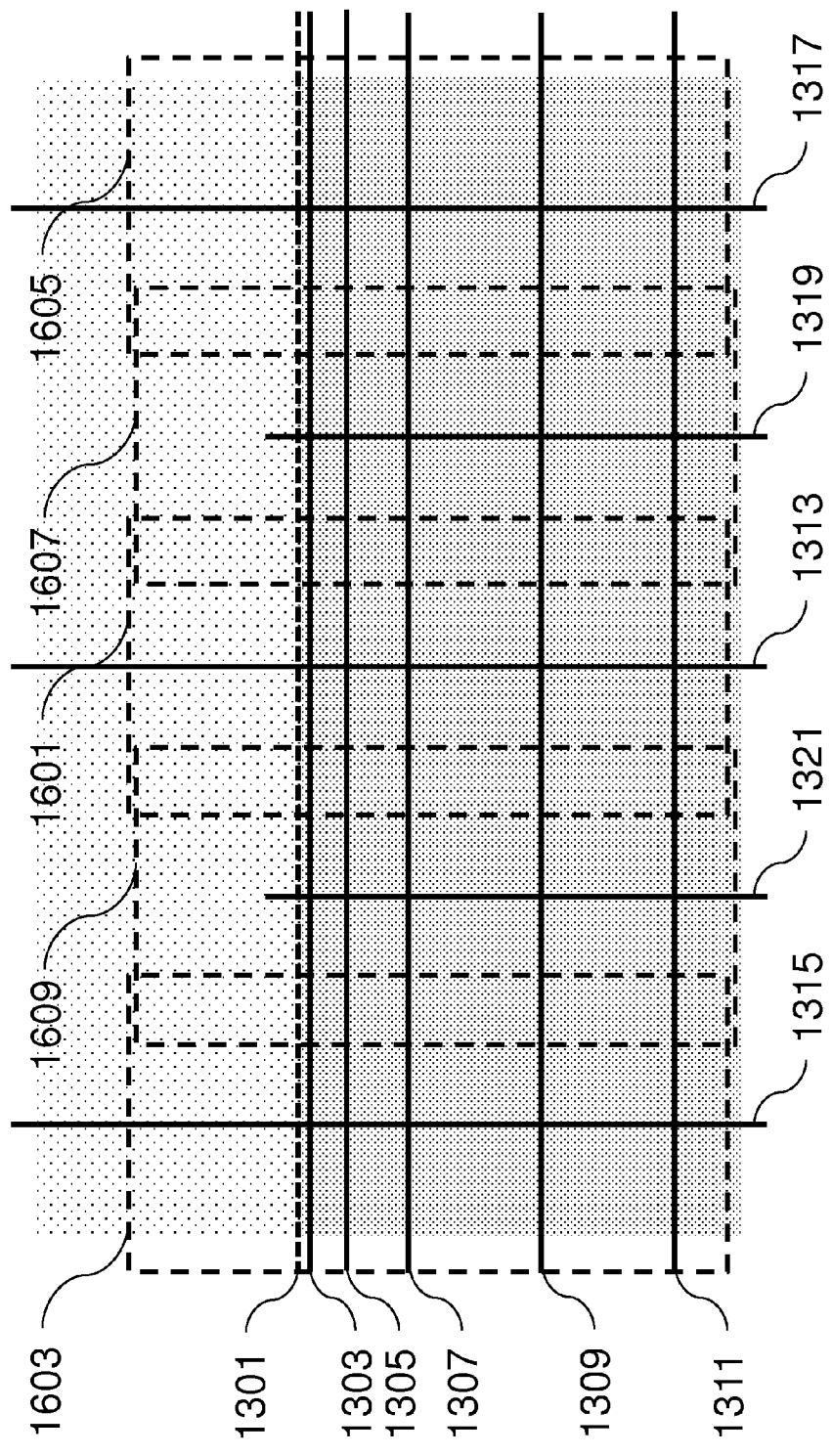
FIG. 16 shows a schematic diagram of a visual band coverage area of a sensor unit according to an implementation form.

FIG. 16 shows a schematic diagram of a visual band coverage area 1601, 1603, 1605, 1607, 1609 of a sensor unit according to an implementation form. The visual band coverage area 1601, the visual band coverage area 1603, the visual band coverage area 1605, the visual band coverage area 1607, and the visual band coverage area 1609 can be realized by sector cameras.

The diagram further comprises a horizon line 1301, an elevation line 1303, an elevation line 1305, an elevation line 1307, an elevation line 1309, an elevation line 1311, a front direction line 1313, an aft direction line 1315, a further aft direction line 1317, a starboard direction line 1319, and a port direction line 1321.

The elevation line 1303 can relate to an elevation of −0.9 degrees and/or a range of 2 km. The elevation line 1305 can relate to an elevation of −1.7 degrees and/or a range of 1 km. The elevation line 1307 can relate to an elevation of −3.4 degrees and/or a range of 500 m. The elevation line 1309 can relate to an elevation of −16 degrees and/or a range of 100 m. The elevation line 1311 can relate to an elevation of −45 degrees and/or a range of 30 m.

The front direction line 1313, the aft direction line 1315, the further aft direction line 1317, the starboard direction line 1319, and the port direction line 1321 can indicate an azimuth.

A complete omnidirectional visual depiction of the ship's or vessel's surroundings can be provided from a set of sector antennas. A stack of e.g. 4 cameras with distortion free optics can be used. They can provide a continuous coverage from short range determined by visibility from the installation locations to the horizon and also including a view above the horizon for reference.

The cameras can provide very low light visibility, and can also have enhanced near-infrared sensitivity to image targets in near no-light situations.

Figure 17:
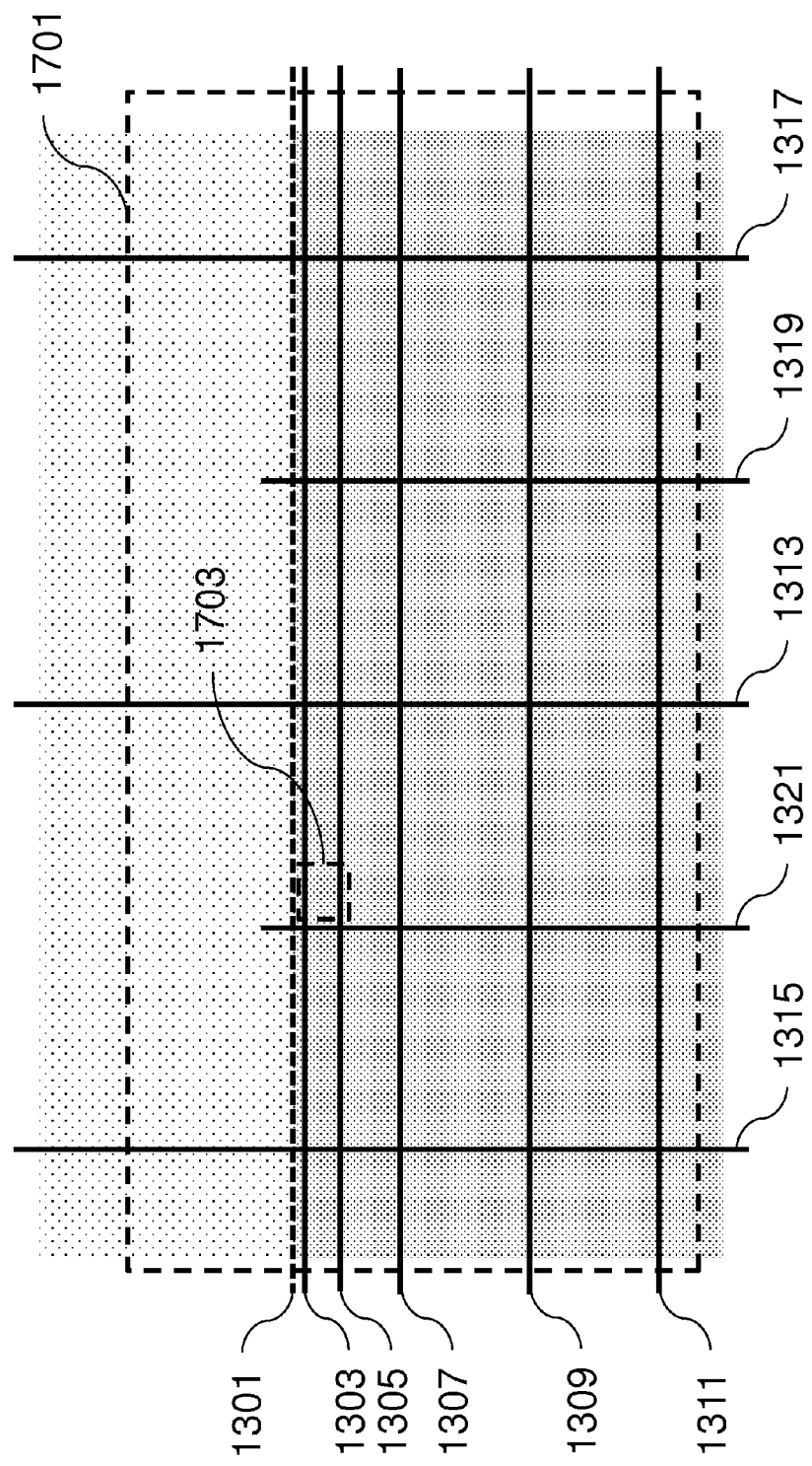
FIG. 17 shows a schematic diagram of an infrared coverage area of a sensor unit according to an implementation form.

FIG. 17 shows a schematic diagram of an infrared coverage area 1701, 1703 of a sensor unit according to an implementation form. The infrared coverage area 1701 and the infrared coverage area 1703 can illustrate a scan area and/or an engagement element.

The diagram further comprises a horizon line 1301, an elevation line 1303, an elevation line 1305, an elevation line 1307, an elevation line 1309, an elevation line 1311, a front direction line 1313, an aft direction line 1315, a further aft direction line 1317, a starboard direction line 1319, and a port direction line 1321.

The elevation line 1303 can relate to an elevation of −0.9 degrees and/or a range of 2 km. The elevation line 1305 can relate to an elevation of −1.7 degrees and/or a range of 1 km. The elevation line 1307 can relate to an elevation of −3.4 degrees and/or a range of 500 m.

The elevation line 1309 can relate to an elevation of −16 degrees and/or a range of 100 m. The elevation line 1311 can relate to an elevation of −45 degrees and/or a range of 30 m.

The front direction line 1313, the aft direction line 1315, the further aft direction line 1317, the starboard direction line 1319, and the port direction line 1321 can indicate an azimuth.

A combined active/passive infrared imager can have a large magnification imaging sector that can be scanned and positioned over a total azimuth and elevation scan area. This sensor can be employed or activated based on requests from an operator or automatically from the system to confirm detection from other sensors.

This sensor can also be able to provide very long range, e.g. larger than 2 km, up to 15 km, classification of targets by providing detailed images and live video for manual inspection or automatic classification. The sensor can also provide a capability to detect submerged targets.

Figure 18:
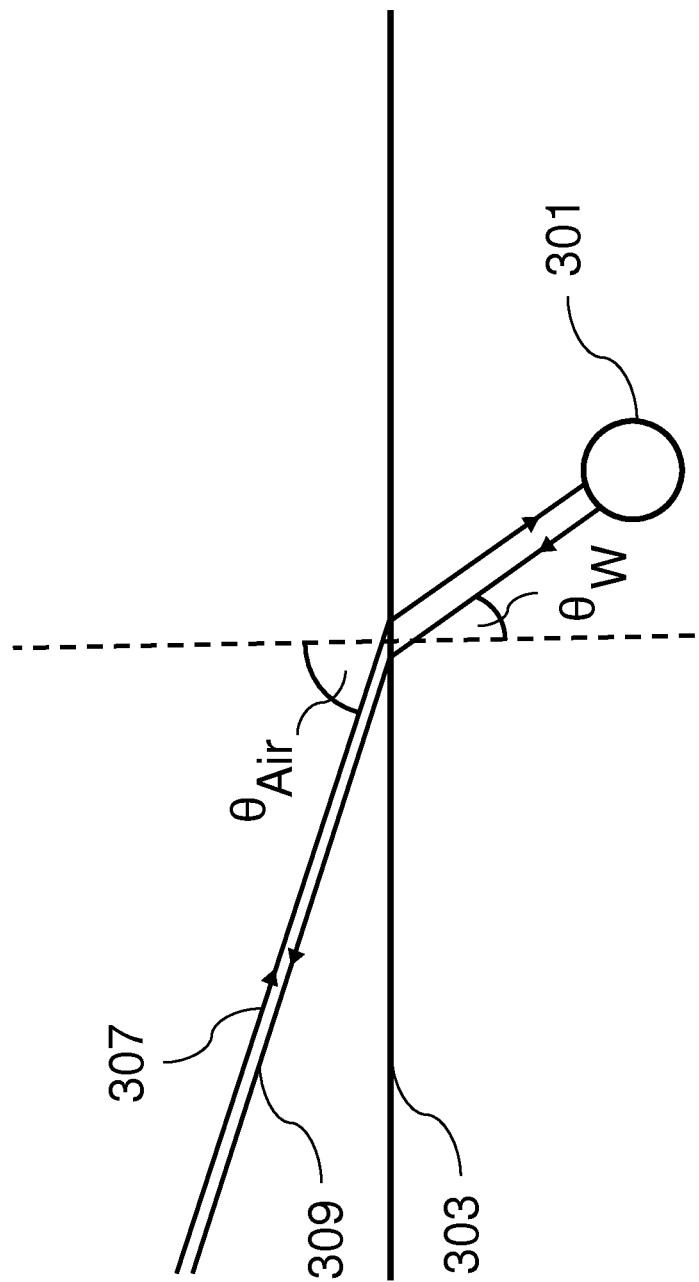
FIG. 18 shows a schematic diagram of a laser beam refraction for detecting an object under a water surface according to an implementation form.

FIG. 18 shows a schematic diagram of a laser beam refraction for detecting an object 301 under a water surface 303 according to an implementation form. The transmitted laser beam 307 and the reflected laser beam 309 can be refracted on the water surface 303.

At oblique angles, the laser beam 307, 309 can enter the water with a steeper angle than the incidence angle according to Snell's law of refraction.

It can be shown that $n_W \cdot \sin(\theta_W) = n_{Air} \cdot \sin(\theta_{Air})$. Assuming $n_W = 1.33$, $n_{Air} = 1.008$, and a grazing incidence angle $\theta_{Air} = 90°$, a critical angle $\theta_{critical} = \theta_W = 49.3°$ can be obtained.

This can mean that even at long ranges when viewed from a ship, a look down into the water is possible.

Figure 19:
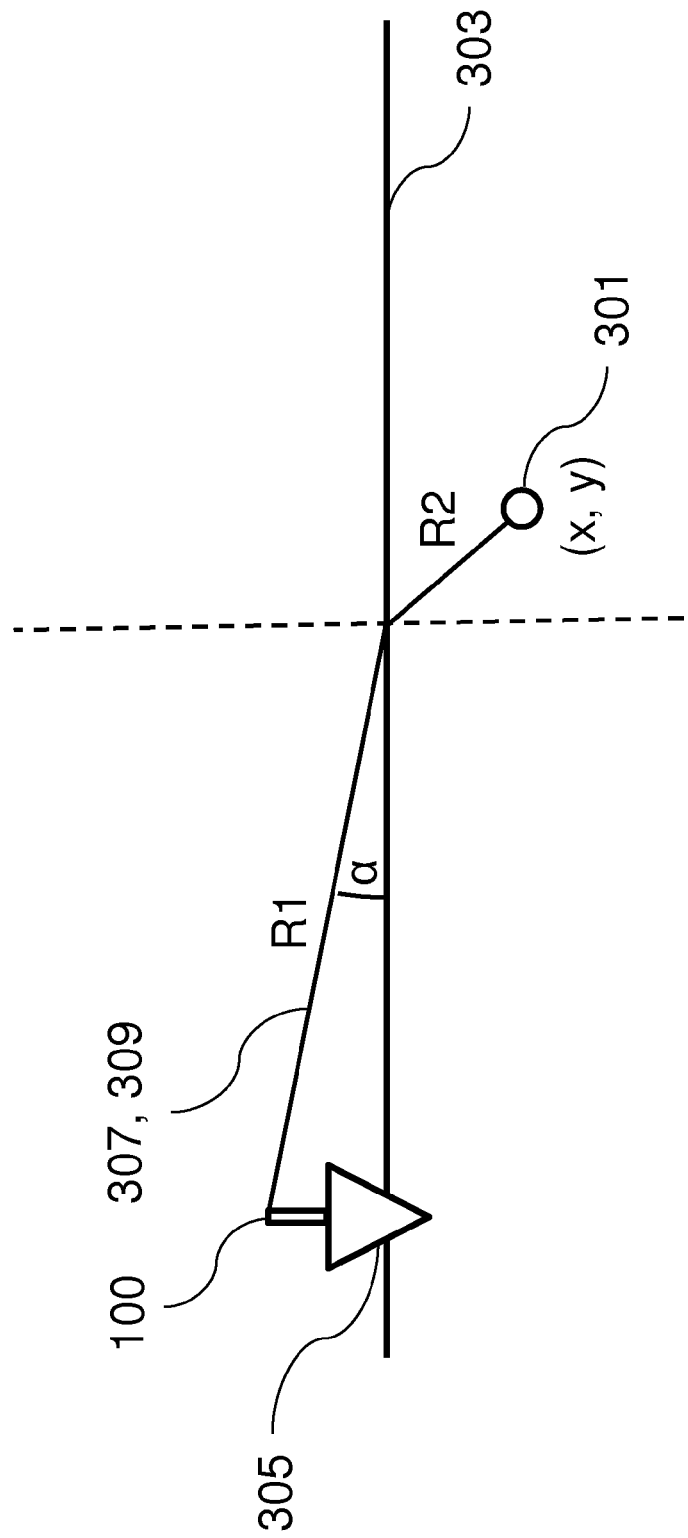
FIG. 19 shows a schematic diagram of a detection scheme for detecting an object under a water surface according to an implementation form.

FIG. 19 shows a schematic diagram of a detection scheme for detecting an object 301 under a water surface 303 according to an implementation form.

The diagram further comprises a laser detection and ranging device 100 mounted on a marine seagoing vessel 305. The transmitted laser beam 307 and the reflected laser beam 309 are refracted on the water surface 303.

The object position is denoted as (x, y). The distance from the laser detection and ranging device 100 to the water surface 303 is denoted as R1. The distance from the water surface 303 to the object 301 is denoted as R2. The angle α is measured between the water surface 303 and the laser beam 307, 309.

By measuring R=R1+R2 and α, absolute values for x and y can be obtained.

The following sea corollaries can be considered. Firstly, reflection and refraction amplitude can be polarization dependent. The VV, i.e. vertical-vertical, polarization can be desirable. Secondly, for a rough sea surface, the surface may not be flat with angles from horizontal up to 10 degrees. The sea surface can comprise gravity waves and/or capillary waves.

Figure 20:
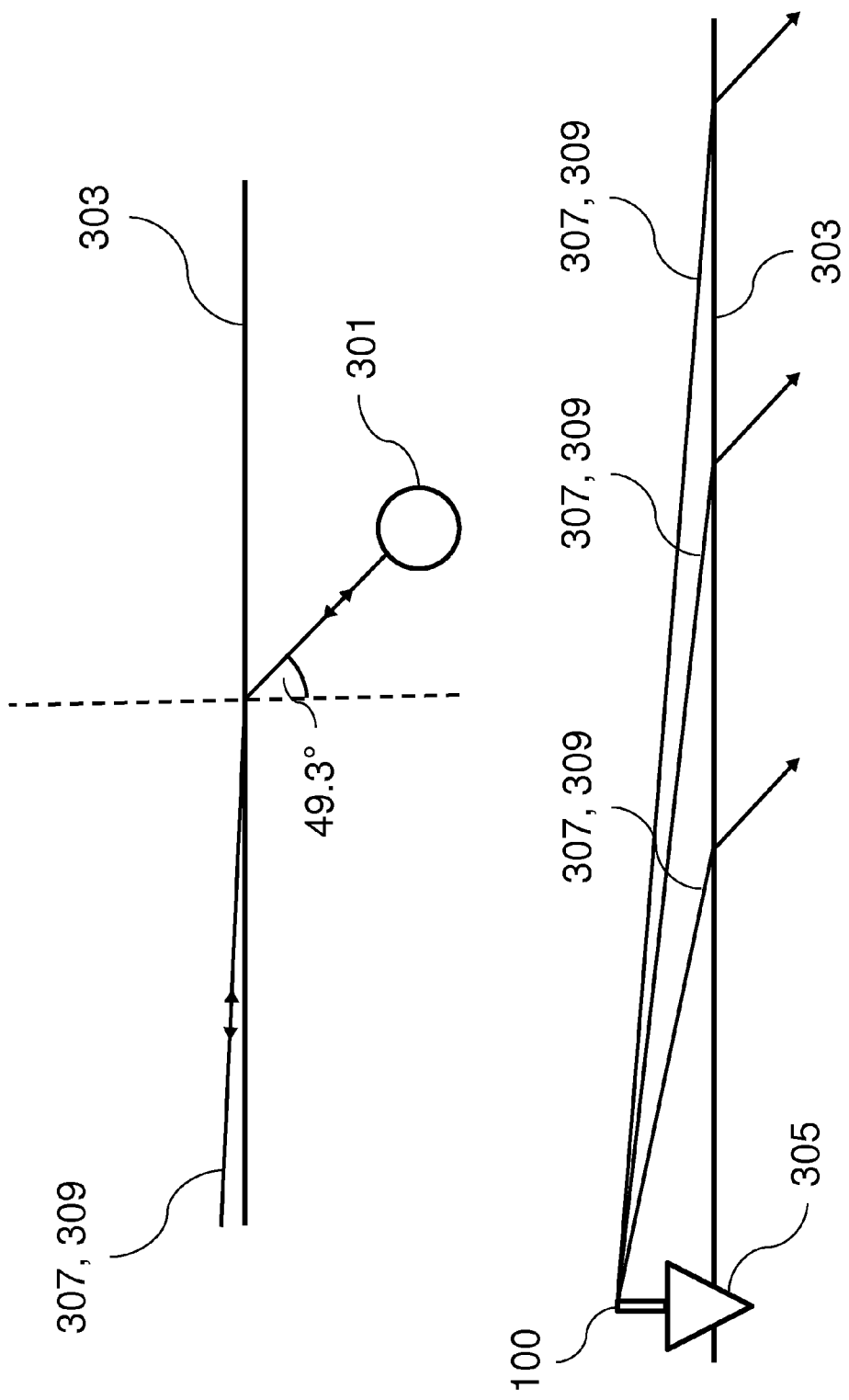
FIG. 20 shows a schematic diagram of a detection scheme for detecting an object under a water surface according to an implementation form.

FIG. 20 shows a schematic diagram of a detection scheme for detecting an object 301 under a water surface 303 according to an implementation form.

The diagram further comprises a laser detection and ranging device 100 mounted on a marine seagoing vessel 305. The transmitted laser beam 307 and the reflected laser beam 309 are refracted on the water surface 303.

The laser beam can follow a path from the laser detection and ranging device 100 to the object 301 and the same path back.

The reflection calculations can be based on the following. The sensor can be mounted 30 meters above sea level. The distance to the object or target can be 1 km. The laser beam angle of incidence to the water surface 303 at the object 301 or target can be arctan(30/1000)=1.7 degree.

The reflection from the air/water interface and the transmission into water can be calculated by the expressions for Fresnel reflections. At a very low angle of incidence to the air/water interface, the reflection can be very high and the transmission into water can be very low.

The transmission into water can amount to 21.5% for the vertical polarization and 12.5% for the horizontal. Thus, if a maximization of the coupling of laser light into the water is desired, the laser can be vertically polarized. Then, 21.5% of the laser light can go into the water.

This light can hit an underwater part of the object 301 or target and can be reflected back. This reflected laser light can once more have to travel through the air/water interface. If it is assumed that the target is a perfect Lambertian reflector, the reflected laser light can be un-polarized. That means that it can be 50%-50% vertically and horizontally polarized.

The reflection loss, and thereby the transmission from water into the air can then be the average of the vertical and horizontal polarization. That is T=17%. The total transmission into and out of the water can then be 21.5%×17%=3.6%, e.g. for vertical polarized input laser light, similarly for horizontal input laser light 12.5%×17%=2.1%. The reflection coefficient of the target can further reduce this.

It can be assumed that the object 301 or target can have the same surface color above and below the water line. Therefore the reflection coefficient from the above water and from the below water can be the same. The below water fraction of the beam can be very much reduced because it can have to travel through the air/water interface twice.

An additional point can be the transmission losses in water. If it is assumed that the laser beam has 1 meter in diameter, the lower part of the beam can have to travel 25 meters through water before hitting the object 301 or target, and then 25 meters back before hitting the water/air interface again. Values for the attenuation of laser light in water can e.g. be between 0,0001 and 0.01 cm^−1. If 0.001 cm^−1 is assumed, the transmission can become 0.7% through 50 meters. This illustrates that the upper part of the laser beam can be a major contributor to the reflection from the object 301 or target.

A further point can be that when 21.5% of the laser beam is coupled into the water, 78.5% can be reflected from the air/water interface. A part of this laser light can hit the above water part of the object 301 or target and can be reflected back towards the sensor. This can increase the contribution to the signal from the above water part of the object 301.

In these calculations, no waves are assumed. This can be an idealized situation. However, it can illustrate the point that the reflection from the above water part of the object 301 or target can be stronger than the reflections from the underwater part.

Figure 21:
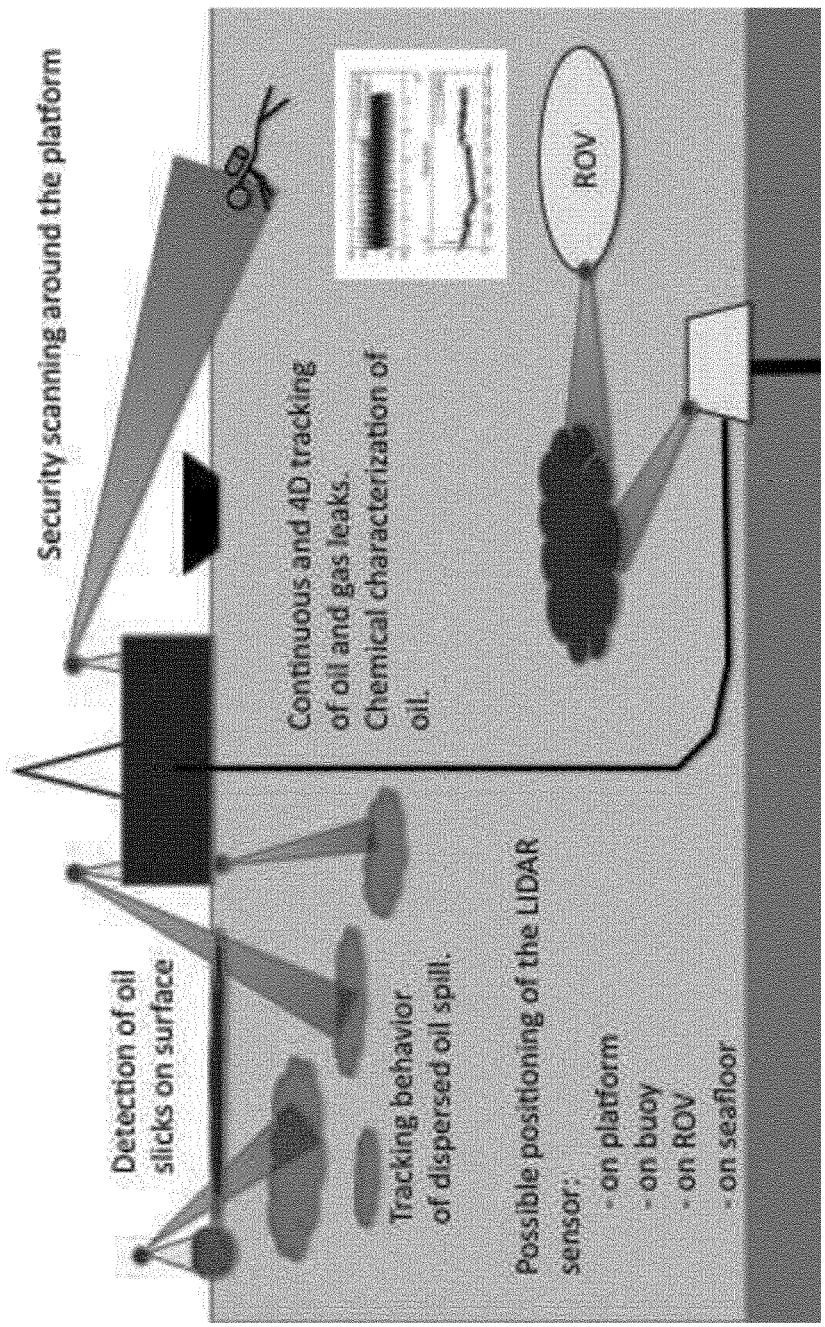
FIG. 21 shows a schematic diagram of possible locations of laser detection and ranging devices according to an implementation form.

FIG. 21 shows a schematic diagram of possible locations of laser detection and ranging devices according to an implementation form.

Possible deployment locations or positions of the laser detection and ranging devices or light detection and ranging devices, can be in air from a platform, on the water surface from a buoy, in the water column from a remote operational vehicle (ROV) or raisers, and/or on the sea floor from a well or a pipeline.

A laser detection and ranging (ladar) based or light detection and ranging (lidar) based concept can provide unique capabilities that can provide the capability to detect and assess oil spills over a whole pipeline range from a well to a platform. A laser beam or laser light can be used to track the dispersion of oil in water. A ladar or lidar device with a blue-light laser beam can be used to detect small objects in, on and below the water surface or sea surface.

The combination of both concepts can lead to a laser detection and ranging device that can be able to detect, track and characterize oil and gas (O&G) in sea water, wherein the laser detection and ranging device itself can be deployed both within the ocean and/or on a rig/vessel to monitor the oil or gas from the air into the water.

The benefits of a ladar or lidar device can include a high detection capability even for small leakage rates paired with a low False Alarm Rate (FAR), a high spatial resolution, i.e. millimeters at ranges to 50 m depending on turbidity and suspended matter, a 4D imaging capability, i.e. 3D plus/over time, and the ability to determine the chemical structure of the oil.

Furthermore, the laser detection and ranging device may use only low power, e.g. in the order of 1 W, so that it can operate for a year or more on simple battery power, which can be relevant for underwater installations. It can also be compatible to EX certification for platform installation. The ability to detect small leakages has great advantages as it can enable an operator to have a much better awareness of the deep sea bottom and water column concerning whether there is a spill or if a spill is just occasional or if the spill is in succession which can represent a possible precursor for an eventual serious breach in well and/or transport integrity.

The laser detection and ranging device can be realized by components, wherein the combination of these components and selection of design parameters, such as wavelength, modulation, and/or transmit/receive (TX/RX) architecture, can create a unique functionality.

The laser detection and ranging device can comprise a solid-state laser with high-speed amplitude modulation and correlation, and a micro-mechanical scanning device. By selecting the wavelength of the laser beam or light, the laser beam or light can penetrate both water and air, and from water to air and vice versa. The laser detection and ranging device can be optimized to operate as an Oil Spill Detection (OSD) system. It can be used as a stand-alone system or complement existing OSD solutions by adding much improved resolution and 4D-tracking. Its water penetrating capabilities can add 4D-tracking capabilities to follow the dispersion of any oil or gas spillage.

The laser detection and ranging device can provide a continuous remote sensing solution for oil operators that can alert the operator of any spillage. The laser detection and ranging device can enable the operators to decide whether an oil spillage exceeds a limit of for example 1 m$^3$/1000 liter. Furthermore, the laser detection and ranging device can be equipped with multi-spectral detectors allowing a chemical characterization of the oil. This can support the operators to determine the type of oil that has been spilled. Also, the laser detection and ranging device can be used to support the cleaning process as the oil type characterization can affect a choice of a cleaning approach, i.e. it can identify a thickness and a type of oil spatially. A 3D or 4D tracking can provide a continuous feedback about the efficiency of a cleaning process, including the dispersant effectiveness.

The laser detection and ranging device can be used as a prime assessment device for the integrity of a well and/or pipeline, in principle from well to platform, by knowing where and when there is a leakage/spill, the type of spill, and volume of spill. It can allow to quickly assess the quantity of a spill with very low FAR.

If operators continuously monitor, e.g. to comply with a 1 m$^3$ release limit, they primarily rely on surveillance by a satellite, e.g. an SAR satellite. This can be expensive, provide a limited spatial/temporal resolution, and provide only a limited coverage as revisit times of satellites are usually at most once every N hours, and weather conditions, especially wind speed, further influences satellite imagery. The laser detection and ranging device can allow a true continuous and in-situ monitoring with high accuracy and resolution with an all-weather capability.

The laser detection and ranging device can combine sensor data with other information sources, e.g. of a plurality of detection devices, sensors and/or sensor platforms by means of data fusion, and can monitor the integrity of the detection or sensor data and other data fused detectors or sensors, i.e. by system health monitoring. The operators can be aware of the actual O&G releases, and can study and act on impacts.

The laser detection and ranging device can be a ladar or lidar based system comprising a laser beam or light with a wavelength optimized for water penetration, an amplitude modulator on the laser beam or light adding a Pseudo Random Noise (PRN) to the transmitted laser beam or light signal, a receiver or detector with a matched filter to recognize the laser beam or light signal from the noise, and a multi-spectral detector to characterize the chemical structure of the parts that reflect the laser beam or light signal.

Ladar or lidar based devices or technologies for maritime applications can focus on the following areas: military use including submarine, floating/submerged mine, and/or diver/swimmer detection, bathymetry for mapping of the ocean bottom/sea floor from vessels and aircrafts, biological characterization regarding fish inventory and environmental mapping from vessels, object detection from vessels, search-and-rescue applications, detection of markers, drifters, met-ocean conditions, such as waves, currents, winds, fronts, eddies, internal waves, reefs, ice floes, sea ice, growlers, mammals, pirates, floating containers, and/or drifting objects.

According to an implementation form, the invention relates to a laser detection and ranging device or a sensor and sensor exploitation system that has a number of application areas related to the maritime environment. These can include vessel safety and security, offshore energy projects, coastal and river applications. A feature of the invention can relate to fully utilize the electromagnetic radiation in a narrow part of the visible range that e.g. permits the transmission of light through a significant body of water, e.g. 5-50 m by means of an active imaging process.

This feature can further be enhanced by having a complement of adjunct sensors that can be tailored to the application, e.g. for ship security. An active ladar can be complemented with passive optical imagers for long range operation and visual characterization and dedicated radar extraction method for complementary object detection of targets on the surface. The invention can therefore include a dedicated data fusion process to provide 3D and time domain fusion of the signals and the appropriate interface and presentation tools.

The invention can relate to range gated active illumination optical target detection and imaging systems. This can imply that the invention relates to a laser detection and ranging device or a system that utilizes active illumination in the form of coded laser emissions, e.g. in the form of a modulated solid state laser, and provides detection by having a very high speed data acquisition system and signal processing implementation to generate range profiles. Also mechanical scanning systems can be included to allow for area scanning and to generate 3D data. Furthermore precision position registration can be included via a satellite positioning and inertial measurement to allow for operation of the sensor in moving or oscillating environments. Additionally, the usage of passive optical sensors in the visible and infrared wavelength bands can be included, also the use of microwave radars and the use of data fusion schemes.

The invention can relate to security and safety for maritime vessels and platforms which can imply that the operators desire to have knowledge of objects in the seas around the vessel. This can include in particular objects that are not seen from the surface and which may be at a depth that could harm the vessel.

The invention can relate to the implementation of a laser detection and ranging device or a sensor that can combine the capabilities of a radar to detect objects over a considerable distance and the capabilities of an active optical system using wavelengths that can penetrate the ocean surface to see deeply submerged targets. This combination of capabilities has not existed before, and the invention can present a solution for this challenge.

According to an implementation form, the invention relates to a laser detection and ranging device or a system for detecting, tracking and classifying objects on or under the sea surface in the vicinity of maritime vessels and maritime platforms utilizing active laser illumination sensors in the conjunction with active radar sensors and passive electro-optical sensors for the purpose of providing situation awareness and the detection of specific objects of interest or threat to the vessel as defined by a dedicated central processing system, comprising the design and operation of the active laser illumination sensor using an electromagnetic wavelength that can significantly penetrate the water surface while illuminating the water surface at a very oblique angle thus obtaining near surface and submerged target detection at significant range using the inherent properties of the air/water interface to by refractive and scattering processes to accept the incoming near horizontal illumination and causing bundles of light at nearer vertical angles to propagate into the water column, and upon reflection from objects to be reradiated in the upwards direction and be again refracted and scattered into the near horizontal direction and being received and processed by a receiving apparatus and therewith also being combined with additional data from passive optical systems which give data from the same surface and in particular providing additional detection and classification of surface and near surface objects and also being combined with data from an active radar sensor that can give detection and verification of surface objects only although thereby enhancing the capabilities of the laser detection and ranging device or the system in certain forms of inclement weather and at large ranges. The overall combined implementation can provide an area coverage limited by a sector up to a full 360 degree coverage and from a range adjacent to the vessel or platform and up to a distance range limited by the physical capabilities of the laser detection and ranging device or the system and giving detection from the surface and to a depth limited by physical characteristics thus providing a full 3D coverage of the surrounding water surface and near surface area from the platform or the vessel.

According to an implementation form, the invention relates to a laser detection and ranging device or a system where the active laser illumination system utilizes a coded waveform to allow for high average power and maximum detection range.

According to an implementation form, the invention relates to a laser detection and ranging device or a system where the active laser illumination system utilizes a code which is concurrent and using code waveform technologies derived from communication and satellite positioning systems.

According to an implementation form, the invention relates to a laser detection and ranging device or a system where the active laser illumination system utilizes a coded waveform with a high switching frequency to allow for range discrimination and filtering of unwanted echoes.

According to an implementation form, the invention relates to a laser detection and ranging device or a system where the active laser illumination system utilizes an interrupted waveform superimposed on the coded waveform to allow filtering and cancellation of echoes close to the laser sensor unit.

According to an implementation form, the invention relates to a laser detection and ranging device or a system where the active laser illumination is selected to be on or near an optimum wavelength of 488 nm to give maximum penetration depth.

According to an implementation form, the invention relates to a laser detection and ranging device or a system where maximum penetration is achieved to more than 5 m and up to 30 m providing physical conditions allow.

According to an implementation form, the invention relates to a laser detection and ranging device or a system where the laser energy is concentrated into a narrow beam which extends to an angular coverage not significantly exceeding the dimensions of the typical objects being detected.

According to an implementation form, the invention relates to a laser detection and ranging device or a system where the laser energy is concentrated into a narrow beam which is shaped in an oval form that allows for range-azimuth equal resolution cells when illuminating a sea patch at large distance.

According to an implementation form, the invention relates to a laser detection and ranging device or a system wherein the optical receiver system comprises an optical receiving apparatus with a beam which is nearly as narrow as the transmitted beam to only register light from the active laser thereby suppressing ambient light.

According to an implementation form, the invention relates to a laser detection and ranging device or a system wherein the receiving system has a very narrow band filter to suppress ambient light thus causing limitation to the detection range at wavelengths that can otherwise influence the detector.

According to an implementation form, the invention relates to a laser detection and ranging device or a system wherein the receiving system utilizes concurrent pulse compression to provide range profiles in real time to the data processor.

According to an implementation form, the invention relates to a laser detection and ranging device or a system wherein the combined receiving and transmitting optics perform a scanning operation in the vertical plane thereby mapping a specific sector in range and in depth.

According to an implementation form, the invention relates to a laser detection and ranging device or a system wherein the combined receiving and transmitting optics perform a scanning operation in the vertical plane thereby mapping a specific sector in range and in depth.

According to an implementation form, the invention relates to a laser detection and ranging device or a system wherein the combined receiving and transmitting optics perform a scanning operation in the horizontal plane thereby mapping a specific sector in azimuth and in depth.

According to an implementation form, the invention relates to a laser detection and ranging device or a system wherein the combined receiving and transmitting optics perform a scanning operation in the horizontal plane as well as in the vertical plane thereby mapping a specific sector in azimuth, range and in depth thereby constituting a 3D system.

According to an implementation form, the invention relates to a laser detection and ranging device or a system wherein the subsystem further comprises at least one out of a thermal sensor, a laser, an infrared sensor and a hyper-/multi-spectral sensor.

According to an implementation form, the invention relates to a laser detection and ranging device or a system wherein the active laser system is supplemented with a coaxial to the laser system passive imaging visual band imager for additional data capture of surface and near surface objects.

According to an implementation form, the invention relates to a laser detection and ranging device or a system wherein the active laser system is supplemented with a coaxial to the laser system passive near infrared, medium infrared or long wave infrared imager for additional data capture of surface and near surface objects under conditions of sunlight, dim light and very low light operation.

According to an implementation form, the invention relates to a laser detection and ranging device or a system wherein the active laser system is supplemented with a set of cameras with panoramic view for additional data capture of surface and near surface objects under conditions of sunlight, dim light and very low light operation.

According to an implementation form, the laser detection and ranging device uses a narrow scanning beam, is designed for eye-safety, uses a slant incidence, uses a non-pulsed waveform, employs specific scanning patterns, applies an ambient light removal, and/or uses precision pointing.

According to an implementation form, the laser detection and ranging device can discriminate between range along the sea surface and depth under the water. It can apply precision pointing, employ a narrow laser beam, provide a high range resolution, and/or measure range as well as elevation precisely.

According to an implementation form, the laser detection and ranging device uses polarization for sunlight suppression and/or uses dual polarization for enhanced detection.

The research leading to these results has received funding from the European Community's Seventh Framework Programme FP7/2007-2013 under grant agreement no 286220.

REFERENCE LIST

100 Laser detection and ranging device
101 Laser transmitter
103 Laser detector
105 Processor
200 Laser detection and ranging method
201 Modulating a laser beam
203 Transmitting the modulated laser beam
205 Detecting a reflected laser beam
207 Detecting the object under the water surface
300A Diagram
300B Diagram
301 Object
303 Water surface
305 Marine seagoing vessel
307 Transmitted laser beam
309 Reflected laser beam
401 Sensor unit
403 Sensor unit
405 Data processor unit 407 Display unit
409 System console unit
411 Radar unit
413 Radar unit
415 Gyro unit
417 GPS unit
419 AIS unit
421 Compass unit
423 System operator
425 System engineer
501 Laser unit
503 Auxiliary sensor unit
505 Mechanical scan unit
507 Real-time motion reference unit
509 Real-time control unit
511 Power supply unit
513 A/D conversion unit
601 Data processor core unit
603 Ethernet network card unit
605 Serial interface unit
607 Fiber/Ethernet switch unit
609 Bridge switch unit
611 Ship sensor unit
613 Data, monitoring and control signal line
615 Data, monitoring and control signal line
617 Observation signal line
619 Observation signal line
701 Visualization unit
703 Interaction unit
705 Keyboard-video-mouse switch unit
707 Display unit
709 Mouse unit
801 Keyboard-mouse-touch unit
803 Command generator unit
805 Network card unit
807 Display control unit
809 Display unit
901 Ship structure
903 Interface
905 Interface
907 Interface
909 Interface
911 Interface
913 Interface
915 Interface
917 Interface
1001 Ladar unit
1003 Visual mirror
1005 Visual window
1007 IR/BIL unit
1009 IR mirror
1011 IR window
1013 Mirror drive unit
1015 Cam unit
1017 Cam unit
1019 Control, IMU and power unit
1101 FPGA unit
1103 RAM unit
1105 A/D conversion unit
1107 A/D conversion unit
1109 CPU unit
1111 RAM unit
1113 FLASH unit
1115 Ethernet unit
1117 IMU unit
1119 Scan controller unit
1121 Step motor drive unit
1123 Step motor drive unit
1125 Piezo drive unit
1127 Piezo drive unit
1201 Ideal circular laser beam
1203 Divergent circular laser beam
1205 Divergent oval laser beam
1301 Horizon line
1303 Elevation line
1305 Elevation line
1307 Elevation line
1309 Elevation line
1311 Elevation line
1313 Front direction line
1315 Aft direction line
1317 Further aft direction line
1319 Starboard direction line
1321 Port direction line
1323 Radar coverage area
1401 Ladar coverage area
1403 Ladar coverage area
1501 Ladar coverage area
1503 Ladar coverage area
1505 Ladar coverage area
1601 Visual band coverage area
1603 Visual band coverage area
1605 Visual band coverage area
1607 Visual band coverage area
1609 Visual band coverage area
1701 Infrared coverage area
1703 Infrared coverage area

The invention claimed is:

1. A laser detection and ranging device for detecting an object under a water surface, the laser detection and ranging device comprising:
    a laser transmitter being configured to modulate a laser beam by a binary pseudo-random coding sequence to obtain a modulated laser beam, and to transmit the modulated laser beam towards the water surface, the modulated laser beam having an oval-shaped laser beam cross-section;
    a laser detector for detecting a reflected laser beam, the reflected laser beam forming a reflected version of the transmitted laser beam; and
    a processor for detecting the object under the water surface upon the basis of the reflected laser beam, wherein the processor is configured to determine a spectrum of the detected laser beam to determine absorbed or reflected laser beam wavelengths by the object.

2. The laser detection and ranging device of claim 1, wherein the laser transmitter is configured to transmit a blue-green laser beam in the wavelength range between 400 nm and 600 nm.

3. The laser detection and ranging device of claim 1, wherein the laser transmitter is configured to modulate the binary pseudo-random coding sequence by a square wave sequence to obtain the modulated laser beam.

4. The laser detection and ranging device of claim 1, wherein the binary pseudo-random coding sequence is a GPS L2 civil moderate length sequence or a GPS L2 civil long length sequence.

5. The laser detection and ranging device of claim 1, wherein the laser transmitter is configured to modulate the laser beam by an on-off-keying modulation or an amplitude-shift-keying modulation to obtain the modulated laser beam.

6. The laser detection and ranging device of claim 1, wherein the laser transmitter is configured to transmit the laser beam towards the water surface at a predetermined angle with respect to the water surface.

7. The laser detection and ranging device of claim 1, wherein the laser detector comprises a laser detecting diode or a photo multiplier for detecting the reflected laser beam.

8. The laser detection and ranging device of claim 1, wherein the laser detector comprises an optical band-pass filter.

9. The laser detection and ranging device of claim 1, wherein the processor is configured to determine a time delay between transmitting the laser beam and detecting the reflected laser beam for determining a range of the object.

10. The laser detection and ranging device of claim 1, wherein the processor is configured to determine a range profile by correlating the transmitted laser beam and the detected laser beam in time, the range profile indicating a range of the object or the water surface.

11. The laser detection and ranging device of claim 10, wherein the processor is configured to determine the range of the object or the water surface in the range profile, and wherein the processor is further configured to detect the object upon the basis of the determined range of the object or the water surface.

12. The laser detection and ranging device of claim 1, further comprising a motion reference unit for determining a motion of the laser detection and ranging device, wherein a beam direction of the laser beam is stabilized upon the basis of the determined motion of the laser detection and ranging device.

13. The laser detection and ranging device of claim 1, wherein the laser transmitter comprises a light emitting diode (LED), in particular a blue-green light emitting diode (LED), for generating a blue-green laser beam in the wavelength range between 400 nm and 600 nm.

14. The laser detection and ranging device of claim 1, wherein the processor is configured to detect an oil slick, a dispersed oil spill, or a gas leakage upon the basis of the reflected laser beam.

15. A laser detection and ranging method for detecting an object under a water surface, the laser detection and ranging method comprising:

modulating a laser beam by a binary pseudo-random coding sequence to obtain a modulated laser beam;

transmitting the modulated laser beam towards the water surface, the modulated laser beam having an oval-shaped laser beam cross-section;

detecting a reflected laser beam, the reflected laser beam forming a reflected version of the transmitted laser beam;

detecting the object under the water surface upon the basis of the reflected laser beam; and determining a spectrum of the detected laser beam to determine absorbed or reflected laser beam wavelengths by the object.

* * * * *